(12) United States Patent
Shiokawa

(10) Patent No.: US 6,575,009 B2
(45) Date of Patent: Jun. 10, 2003

(54) MANDREL INSERTION TYPE METAL FORMING OF RACK BAR

(75) Inventor: Seiji Shiokawa, Mishima (JP)

(73) Assignee: Kabushiki Gaisha Koshingiken, Mishima (JP)

( * ) Notice: Subject to any disclaimer, the term of this patent is extended or adjusted under 35 U.S.C. 154(b) by 121 days.

(21) Appl. No.: 09/765,610

(22) Filed: Jan. 22, 2001

(65) Prior Publication Data

US 2002/0044439 A1 Apr. 18, 2002

(30) Foreign Application Priority Data

Feb. 14, 2000 (JP) ........................................ 2000-034544
Jul. 10, 2000 (JP) ........................................ 2000-208323
Aug. 28, 2000 (JP) ........................................ 2000-256606

(51) Int. Cl.[7] ............................................. B21D 39/08
(52) U.S. Cl. ................................. 72/370.06; 72/370.21; 29/893.34
(58) Field of Search ............................ 29/893.3, 89.34; 72/FOR 101, 356, 370.04, 370.06, 370.07, 370.21, 364

(56) References Cited

U.S. PATENT DOCUMENTS 4,771,627 A * 9/1988 Speakman ............... 72/370.06
6,317,979 B1 * 11/2001 Yamawaki ............... 29/893.34

* cited by examiner

Primary Examiner—Lowell A. Larson
(74) Attorney, Agent, or Firm—Oblon, Spivak, McClelland, Maier & Neustadt, P.C.

(57) ABSTRACT

A method for producing a rack bar for a steering mechanism in an automobile. A blank pipe is held in a die, which has, at its inner surface, linear tooted portions. Mandrels are inserted repeatedly to the blank pipe while the direction of the insertion is alternately changed, while the insertion of the mandrel on one side of the blank pipe and the withdrawal of the mandrel on the other side are overlapped. Furthermore, lubrication is controlled so that an increased temperature of the work around 200° C. as generated under the plastic deformation of the metal is kept. An increased efficiency as well as reduced cost are obtained.

34 Claims, 16 Drawing Sheets

$\longleftrightarrow$
f 1

$\longrightarrow$
f 2

MANDREL INSERTION TYPE METAL FORMING OF RACK BAR

BACKGROUND OF THE INVENTION

1. Field of the Invention

The present invention relates to a method and apparatus for a linear operated type metal forming process for obtaining, efficiently and precisely, a deep recessed pattern on a partial or an entire surface of a tubular blank material having an axial hollow space of a desired cross sectional shape such as triangle, a square, a polygonal, an odd or a circular shape. The present invention can, for example, be preferably utilized for obtaining a so-called VGR type rack bar as a part in a steering device of an automobile. However, the present invention can also be utilized in any different field of application for obtaining a mechanical part or an ornamental product where a formation of a projected or recessed pattern on its surface is required.

2. Description of Related Art

In Japanese Examined Patent Publication (kokoku) No. 3-5892, a metal forming technique for producing, from a hollowed member (a pipe), a rack bar as a part in a steering device is disclosed. In a metal forming process of a rack bar in this patent, a pipe member, which is thermally softened, is held in a die and is subjected to a pressing so that the pipe member is flattened at a location where a rack is to be formed. Then, a die having straight teeth is engaged with the flattened part of the pipe member, while a mandrel is inserted to the central bore of the pipe member. The mandrel is provided with a tapered operating portion, which is engaged with an inner surface of the flattened portion and is forced into the axial bore of the pipe member, which causes the material to be radially outwardly flown into the cavities of the die, thereby forming, on the flattened portion of the pipe member, the straight teeth of which correspond to the straight teeth on the formation die.

The Japanese '892 patent is directed to a formation of a rack bar by a forced penetration of the mandrel into the pipe under an outwardly heated condition. Namely, when the pipe is subjected to a flattening process, the pipe is, at the portion to be flattened, subjected to a heating process, which causes the flattened portion to be softened. Such a softening of the flattened portion causes the later to be inwardly and centrally thickened, thereby causing the flattened portion to be shaped as a convex lens at a transverse cross section thereof. Due to such cross sectional shape of the convex lens of the flattened portion of the pipe, the degree of the engagement of the mandrel with the flattened portion of the pipe can be increased.

The technique disclosed by the Japanese '892 patent is defective in terms of a reduced precision of products, which makes it difficult that the products are actually used. Furthermore, the prior art method is defective also in that its production cost is high due to the fact that the process is complicated, on one hand and that, on the other hand, the cost of the device is high.

SUMMARY OF THE INVENTION

In view of the above, an object of the present invention is to provide a technique for metal forming capable of overcoming the above-noted difficulties in the prior art.

Another object of the present invention is to provide a technique for a metal forming capable of obtaining an increased precision, while preventing the process from being complicated.

According to the first aspect of the present invention, a process is provided for producing an article with toothed portions, such as a pipe shaped rack bar, comprising the steps of:

a) providing a die having, at its inner surface, toothed portions;

b) holding a blank pipe in the die;

c) providing a mandrel having a tapered operating head;

d) inserting, repeatedly, the mandrel into an axial space of the blank pipe, so that the operating head of the mandrel causes the material to flow radially outwardly toward the inner surface of the die, thereby generating toothed portions on the blank pipe corresponding to the toothed portions of the die;

e) keeping, during the repeated insertions of the mandrel, an increased temperature of the work generated by a heat substantially solely by the execution of the insertion of the mandrel to the blank pipe, which temperature is substantially in a range where a so-called work-softening phenomenon is obtained;

f) preventing, during the repeated insertions of the mandrel, the metal from being subjected to an age-hardening, and;

g) maintaining an increased temperature of the work generated substantially solely by a heat due to the execution of the insertion of the mandrel to the blank pipe.

According to this aspect of the invention, during the execution of the metal forming by the repeated insertion of the mandrel to the blank pipe, quasi-warm or semi-warm working condition of a temperature around 200° C. substantially solely generated by the metal is maintained, while preventing an age-hardening from being occurred, resulting in an increased degree of a flowability of metal. Furthermore, under such an increased degree of the flowability of metal, a cancellation of any deviated flow of metal to the die is done, thereby producing a rack bar having teeth of a precision as fine as 32 $\mu$m. Furthermore, according to the present invention, an introduction a blank pipe to the die-set is done under a room temperature, and any preheating process is unnecessary. Furthermore, once a clamping of a blank pipe by the die set is done, all the processes for the metal forming of the rack bar are completed without opening the die set. Thus, a highly increased production efficiency is obtained, resulting in a reduced production cost.

According to a second aspect of the invention, a process is provided for producing a rack bar, comprising the steps of:

a) providing a die having, at its inner surface, toothed portions along the length of the die;

b) holding a blank pipe in the die;

c) providing mandrels each having at least one tapered operating head;

d) inserting, repeatedly, the mandrels into an axial space of the blank pipe so that the operating head of the mandrel causes the material to be flown radially outwardly toward the inner surface of the die, thereby generating toothed portions on the blank pipe corresponding to the toothed portions of the die;

e) reversing, alternately, the direction of the insertion of mandrels to the blank pipe for keeping a symmetrical flow of a metal toward the die, and;

f) overlapping the insertion of the mandrel one side of the blank pipe and the withdrawal of the mandrel on the other side of the blank pipe, such that the insertion of the mandrel to the blank pipe in one direction is commenced prior to the completion of withdrawal of the mandrel from the blank pipe in the other direction, and;

g) maintaining an increased temperature of the work generated substantially solely by a heat due to the execution of the insertion of the mandrel to the blank pipe.

According to this aspect, a rack bar of an increased precision can be obtained irrespective of a fact that the production is done under a metal forming principle. Thus, the production efficiency as well as a cost can be highly reduced.

According to the third aspect of the present invention, a pipe shaped rack bar is provided, which is made, purely, of metal forming process from a blank pipe, wherein said metal forming process is such that the blank pipe is subjected to repeated insertions of a mandrel alternately between opposite sides of the blank pipe, while keeping a semi-warm working condition of a temperature around 200° C. substantially solely generated by the execution of the metal forming process, while preventing an age-hardening from being generated, while preventing an occurrence of a deviated flow of metal to the die.

According to this, aspect of the present invention, the rack bar is purely made by a metal forming process. In other words, while any machining process is substantially unnecessary, a precision as fine as 32 micron can be obtained.

According to a fourth aspect of the invention, a pipe shaped rack bar is provided, which is made, purely, of metal forming process from a blank pipe by inserting a mandrel to the hollow space in the blank pipe held by a die having toothed portions, wherein said rack bar having toothed portion corresponding to the toothed portions of the die and wherein each of the teeth in the toothed portion of the rack bar has layers which are symmetrical to the center of the teeth.

According to this aspect of the invention, the rack bar has, at its toothed portion, symmetrical flown layers, which can prevent any non-uniform spring back amount, which otherwise causes the precision of the rack bar to be worsened.

According to a fifth aspect of the present invention, a mandrel is provided for use together with a die having, at its inner surface, toothed portions for effecting a metal forming process, wherein the mandrel is inserted to a blank pipe held by the die so that a radially outward metal flow under the plastic deformation is obtained, thereby forming, on the blank pipe, teeth corresponding to the toothed portions of the die, said mandrel comprising axially spaced heads having respective operating diameters, the values of the operating diameters being increased in the direction of an increase in the insertion depth of the mandrel.

According to this aspect of the invention, the provision of the axially spaced heads allows a multistage expansion of the material to be obtained during a single insertion of the mandrel, thereby increasing an efficiency in the metal forming process.

According to a sixth aspect of the invention, a die assembly is provided, comprising a die holder having an outwardly opened and longitudinally extending recess, a toothed die detachably housed in said recess and at least one tapered piece press fitted to said recess of the die holder for causing the toothed die to be longitudinally urged, so that the toothed die is fixedly held in the recess of the die holder, said die holder having a hole extending therethrough and opened to said tapered piece at a bottom surface of the recess, the hole being for receiving a presser which is engaged with the pin for causing the tapered piece to be withdrawn from said recess, thereby allowing the die assembly to be dismantled.

According to this aspect of the invention, the use of tapered pieces allows the assembly to be firmly assembled, thereby preventing any rattling, thus resulting in an increased service life. Furthermore, any additional press fitting as well as shrinkage fitting are unnecessary, resulting in a reduced production cost.

According to a seventh aspect of the present invention, a linearly operated metal forming device is provided for producing a pipe shaped rack bar from a blank pipe, said device comprising:

a plurality of die sets, each die set being capable of moved between a closed position for holding a blank pipe as a work and an opened position for allowing the work to be taken out;

a bed on which said die sets are arranged in parallel;

a first presser of said die sets, by which the die sets are laterally adjoined with each other while the blank pipes are held by the respective die sets;

mandrels to be inserted to the respective blank pipes;

a mandrel holder for holding, in parallel, the mandrels at a predetermined spacing, and;

a second presser of said mandrel holder, by which the mandrels held by the holder are simultaneously inserted to the respective blank pipes held by the respective die sets, so that the blank pipes are subjected simultaneously to the metal forming process, thereby forming, on the outer surfaces of the blank pipes, teeth corresponding the toothed portions of the respective die sets.

According to this aspect of the invention, during the execution of metal forming process of the rack bars, the die sets are arranged on the bed under a laterally adjoined relationship. As a result, the toppling moment as generated by the insertion of mandrels to the respective die sets are cancelled between the die sets, which are adjoined with each other. This arrangement is advantageous in that a single usage of the cylinder (presser) is sufficient for closing the die sets irrespective of the number of the die sets on the bed. Furthermore, since the cancellation of the toppling moment between the adjacent die sets, an output of the cylinder for keeping the die sets to be closed is unchanged, which is advantageous in that a reduced size of the cylinder can be used.

According to an eighth aspect of the invention, a linear operated metal forming device is provided for producing a pipe shaped rack bar from a blank pipe, said device comprising:

a plurality of die sets, each die set being capable of moved between a closed position for holding a blank pipe as a work and an opened position for allowing the work to be taken out;

a bed on which said die sets are arranged in parallel;

a first presser of said die sets, by which said die sets are laterally adjoined with each other while the blank pipes are held by the respective die sets;

mandrels to be inserted to the respective blank pipes;

a plurality of mandrel holders, each of which is for holding, in parallel, the mandrels at a predetermined spacing;

a stacker for holding mandrels so that they are stacked with each other;

the arrangement of the mandrels between the stacked holders being such that the degree of the metal forming is progressed in the stacked direction;

a second presser by which the stacker are progressively shifted in the stacker so that the mandrel holders of different stages are progressively aligned with the die sets, and;

a third presser by which the mandrels held by the aligned mandrel holder are simultaneously inserted to the respective blank pipes in the die sets and withdrawn from the respective blank pipes, thereby executing a multi-stage working by progressively changing the mandrels inserted to the blank pipes by the stepwise displacement of the mandrel holders in the stacker.

According to this aspect of the invention, the mandrel holders for holding mandrels are capable of being shifted in the stacker in accordance with the progress of the operating steps of the rack bars. Thus, a multi-stage working of the blank pipes by a simultaneous insertion of the mandrels is done while progressively changing the operating diameters of the mandrels by shifting the mandrel holders in the stacker. Thus, the efficiency in the rack bar production can be highly increased.

According to nineth aspect of the invention, a linear operated metal forming device is provided for producing a pipe shaped rack bar from a blank pipe, comprising:

a plurality of die sets, each die set being capable of moved between a closed position for holding a blank pipe as a work and an opened position for allowing the work to be taken out;

a bed on which said die sets are arranged in parallel;

a first presser of said die sets, by which said die sets are laterally adjoined with each other while the blank pipes are held by the respective die sets;

mandrels to be inserted to the respective blank pipes;

a plurality of mandrel holders, each of which is for holding, in parallel, the mandrels at a predetermined spacing;

a pair of stackers for holding mandrels so that they are stacked with each other, one of the stackers being arranged on one side of the bed while the other stacker is arranged on the opposite side of the bed;

the arrangement of the mandrels between the stacked mandrel holders being such that the degree of the metal forming is progressed in the stacked direction;

a second presser by which the mandrel holders on one of the stackers are progressively shifted in the stacker so that the mandrel holders are progressively aligned with the die sets;

a third presser by which the mandrel holders on the other stackers are progressively shifted in the stacker so that the mandrel holders are progressively aligned with the die sets;

a fourth presser by which the mandrels held by the aligned mandrel holder in one of the stackers are simultaneously inserted to the respective blank pipes in the die sets and withdrawn from the respective blank pipes, and;

a fifth presser by which the mandrels held by the aligned mandrel holder in the other stacker are simultaneously inserted to the respective blank pipes in the die sets and withdrawn from the respective blank pipes;

the arrangement being such that, at each shifted position of the stackers, an alternated insertion to the blank pipes is done between the mandrels held by the mandrel holders aligned with the die sets in one of the stackers and the mandrels held by the mandrel holders aligned with the die sets in the other stackers.

According to this aspect of the invention, the insertion of the mandrels held by the mandrel holders at an operating stage is done alternately between the left-hand and right-hand stackers. Thus, increased precision of the rack bars is obtained while keeping increased production efficiency.

According to a tenth aspect of the invention, a linear operated metal forming device is provided for producing a pipe shaped rack bar from a blank pipe, comprising:

a die set for holding a blank pipe, said die set having toothed portions faced with the blank pipe;

a bed on which said die set is arranged;

a mandrel to be inserted to the blank pipe held by the die set, so that teeth corresponding to the toothed portions on the die are formed on the blank pipe;

a hydraulic cylinder for causing the mandrel to be reciprocated;

a first rib extending, in a cantilever fashion, from the bed, and;

a second rib extending, in a cantilever fashion from a free end of the first rib, said second rib having a free end fixedly connected to the hydraulic cylinder;

the arrangement of the first and second ribs being such that, during the metal forming by the insertion of the mandrel to the blank pipe, the deflection of the first rib and the deflection of the second rib are opposite each other so that they are substantially crossed out, thereby keeping an alignment of the axis of the cylinder with the axis of the blank pipe.

According to this aspect of the invention, any deflection of the axial of the mandrels is cancelled irrespective of a cantilever nature of the machine frame. Thus, an increased service like is obtained, while keeping an increased production efficiency.

DETAILED DESCRIPTION OF THE PREFERRED EMBODIMENTS

Figure 1:
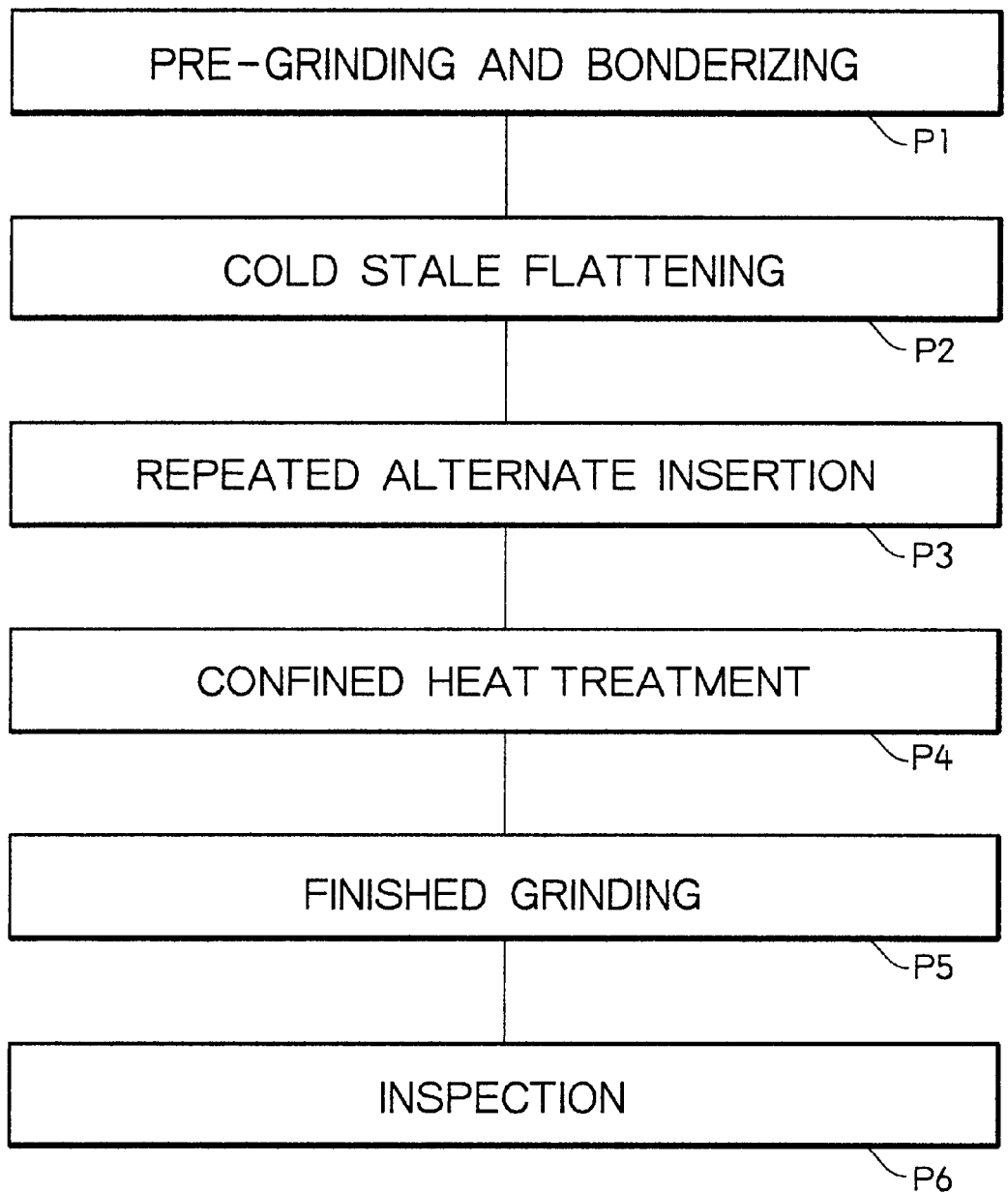
FIG. 1 is a flow chart showing an entire process for producing a rack bar according to the present invention.

FIG. 1 schematically illustrates procedures for producing a rack bar according to the present invention, which include a step P1 for a pre-grinding of a pipe 11 shaped blank together with a bonderizing, a step P2 for effecting a partial flattening of the ground pipe, a step S3 for effecting a metal forming of a rack teeth on the flattened portion of the pipe by repeatedly and alternately inserting a mandrel to the pipe, a step P4 for effecting a confined type heat treatment of the obtained rack bar, a step P5 for effecting post-rough-grinding and a final grinding and a step P6 for effecting an inspection of a meshed state of the finished rack bar. The confined type heat treatment refers to a heat treatment of a work including a hardening as well as annealing, while the work is subjected to a dimensional confinement, thereby preventing the work from being subjected to a reduction in precision. In a usual process for production of a rack bar, grinding is done after a completion of a heat treatment, in order to correct any errors generated by a heat treatment, thereby maintaining the desired precision of the work. However, the heat treatment at the step P4 is the confined type, where a locally deviated flow of the material does not likely, thereby reducing a possibility in a reduction in a precision as obtained by the grinding. Such a pre-grinding can be done prior to the execution of a flattening of the pipe. When the rack bar is of VGR type, where the pitch as well as the inclination angle are varied along the length of the rack bar, execution of the grinding will be difficult after the formation of the rack. The grinding of the work under the rounded cross sectional shape or flattened cross sectional shape prior to the execution of the formation of the teeth is advantageous in an increased efficiency over the execution of the grinding after the completion of the metal forming process of the rack.

Figure 2:
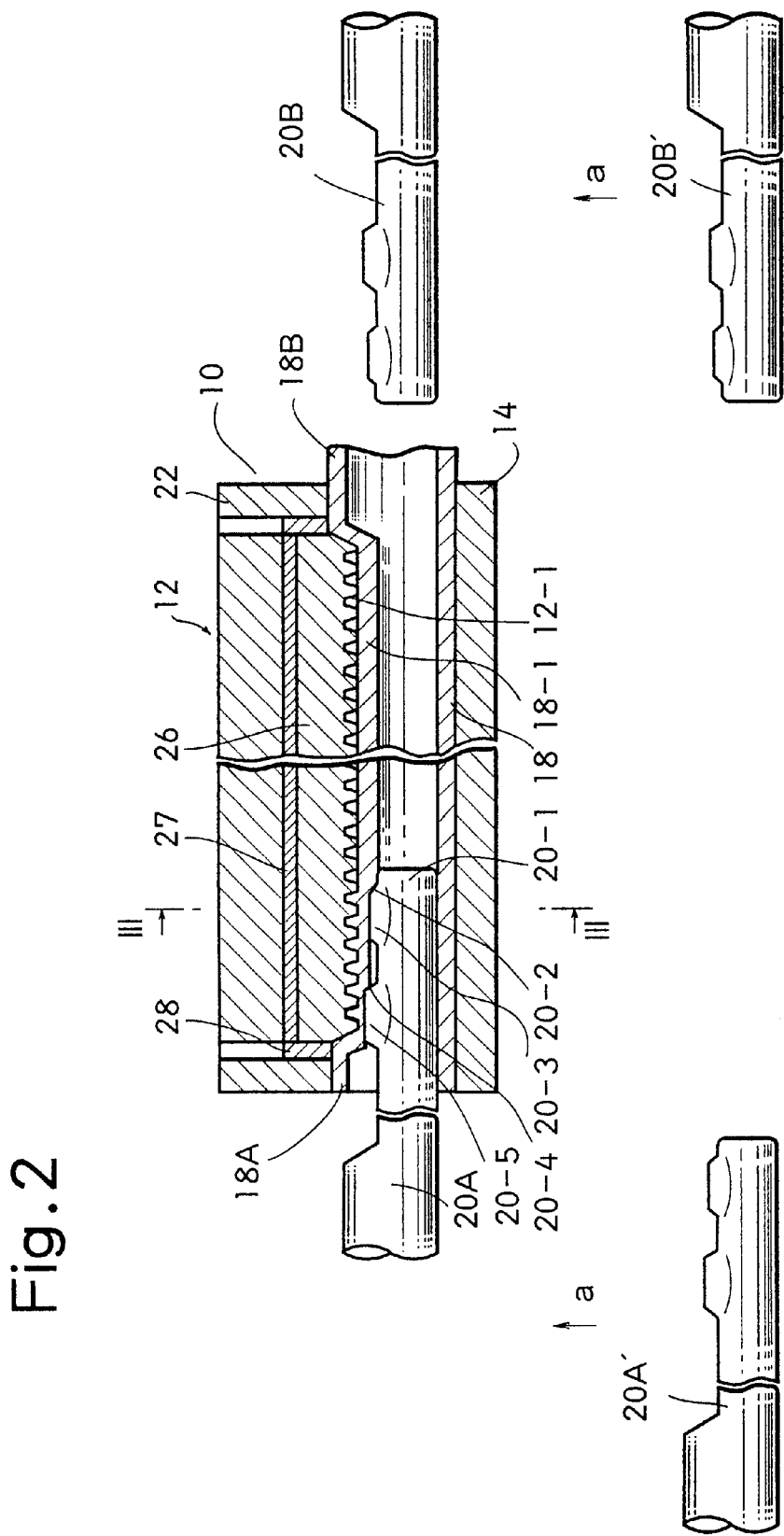
FIG. 2 illustrates schematically a rack bar forging by an alternate and repeated insertion of mandrels to a blank pipe according to the present invention.
Figure 3:
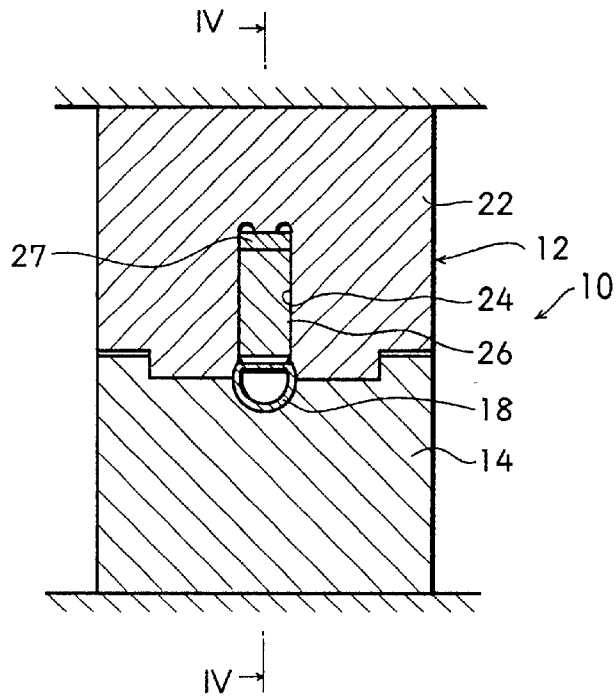
FIG. 3 is a transverse cross-sectional view of a die assembly used in the device in FIG. 2.
Figure 4:
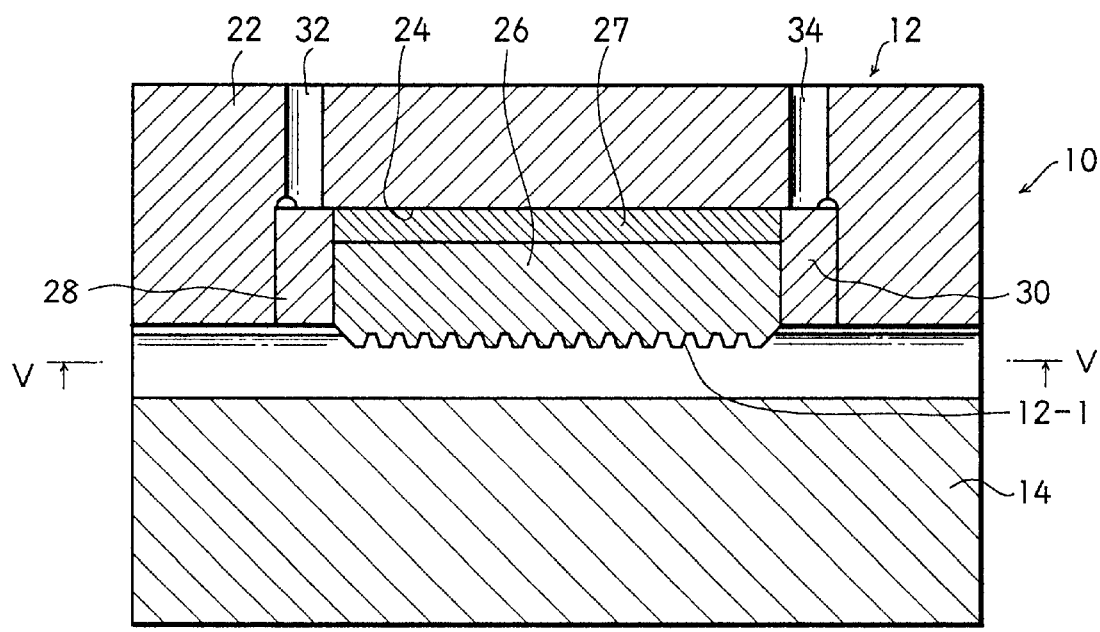
FIG. 4 is a longitudinal cross-sectional view of the die assembly taken along a line IV—IV in FIG. 3.

Now, the step P2 for an execution of the flattening and the step P3 of the metal forming (forging) by the repeated and alternate insertion of the mandrel will be explained in detail with reference to FIGS. 2 to 6. As shown in FIGS. 3 and 4, a die assembly 10 is constructed by an upper die 12 and a lower die 14. FIG. 6A illustrates the die assembly 10 when it is under an opened state while FIG. 6B illustrates the die assembly 10 when it is under a closed state. The upper die 12 has, at its inner surface, a longitudinal recess on which toothed portions 12-1 of a shape of a rack is formed. The lower die 14 is, at its upper surface faced with the upper die 12, formed with a longitudinal groove 14-1 of a semi-circular cross sectional shape. FIG. 6A illustrates a state where a circular cross sectional shaped pipe 18 (work) is loaded on the semi-circular cross sectional shaped longitudinal groove 14-1 of the lower die 14.

Figure 5:
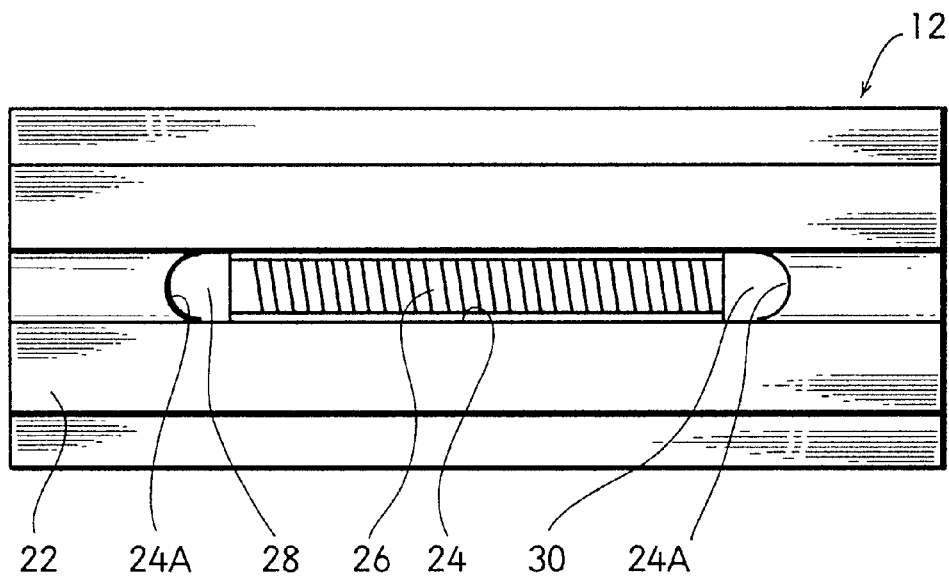
FIG. 5 is a bottom view of an upper split die taken along a line V—V in FIG. 4.
Figure 6A:
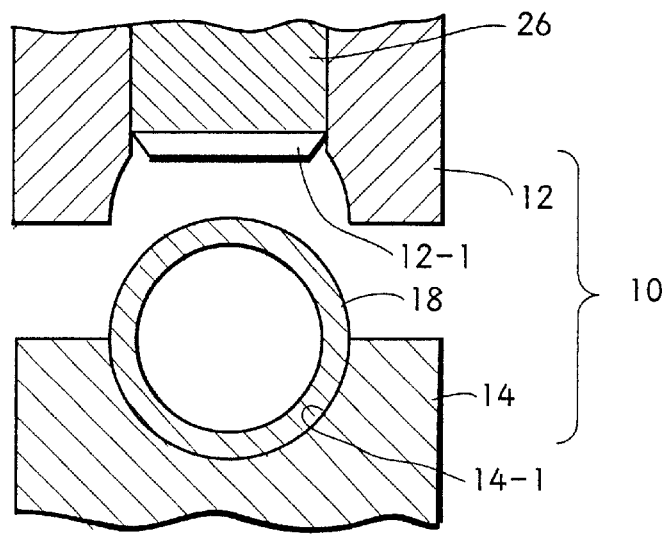
FIG. 6A illustrates an enlarged cross sectional view of the die assembly when the latter is under an opened condition.
Figure 6B:
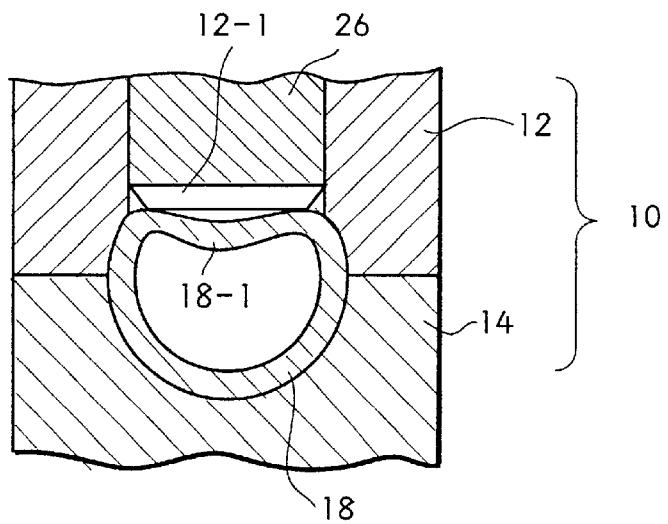
FIG. 6B illustrates an enlarged cross sectional view of the die assembly when the latter is under a closed condition for flattening the blank pipe.

In FIGS. 3 to 5, the die assembly 12 has a holder 22. The holder is formed with a rectangular shaped recess 24, in which a toothed die 26 is arranged. At the top of the recess 24 of the holder 22, a metal liner 27 is arranged. A pair of press fit pieces 28 and 30 are arranged at longitudinal ends of the toothed die 26. As shown in FIG. 5, the recess 24 has a rounded portion 24A of a diameter, which is equal to the width of the recess 24. Furthermore, the press fit pieces 28 and 30 are formed with a rounded cross sectional shape which correspond to that of the recess 24A. Furthermore, at least one of the press fit pieces 28 is of a slightly wedge shaped, which allows the toothed die 26 to be held in the rectangular recess 24 of the holder 22 when the press fit of the pieces 28 and 30 to the recess 24 is done. A press fitting of the pieces 28 and 30 causes the toothed die 26 to be axially engaged with the rectangular shaped recess 24, thereby firmly holding the toothed die 26 in the holder 22. Furthermore, due to the arrangement of the press fitted pieces 28 and 30 at the ends of the axially elongated toothed die 26, the latter is prevented from being loosened with respect to the load generated in the toothed die 26 in the axial direction when the mandrel 20 is reciprocated during the execution of the metal forming process, thereby obtaining an increased service life of the toothed die 26. Furthermore, a mere press-fit of the toothed die 26 into the rectangular recess 24 of the holder 22 is sufficient for preventing the toothed die 26 from being accidentally drawn from the recess 24. This advantage is caused by the fact that the toothed die 26 is subjected to a thermal expansion under the heat as generated during the execution of the metal forming, which causes the toothed die to be tightly fitted to the recess 24. The rounded portion 24A at the longitudinal ends of the rectangular recess 24 for receiving the toothed die 26 can prevent any stress concentration from being occurred, thereby enhancing a service life of the die 26. Furthermore, the rounded portion 24A can easily be machined by merely using an end mill due to the fact that the value of the radius of the rounded portion 24A is equal to the width of the recess 24 as clearly shown in FIG. 5. Finally, as shown in FIG. 4, the recess 24 is formed with bores 32 and 34 opened to the top surface of the recess 24. Ejector pins (not shown) can be inserted to the bores 32 and 34, resulting in a removal of the pieces 28 and 30 from the bores. This feature is advantageous in that the die assembly 12 can be very easily dismantled.

It is necessary that the thickness of the liner 27 is such that a product (rack bar) of a desired precision is obtained. Namely, test dieing is done while gradually changing the thickness of the liner 27, which makes it possible to know a suitable value of the liner thickness to obtain a desired product. As a result of this, amazing precision of the rack bar as fine as 32 μm can be realized according to the present invention irrespective of a fact that the rack bar is the forged product.

The toothed die 26 is desirably produced by using a wire cut electric spark machine with a numerical control system. The well known technique of computer aided design (CAD), which is followed by a trial and error type feedback, can be employed to produce a desired numerical control program for operating wire cut electric spark machine. Once the desired program is obtained, the grinding of the toothed die 26 is fully automated. As a result, a reduction in the production cost of the toothed die 26 of a highly increased precision is realized.

After the completion of the machining, the toothed die 26 is subject to a hardening process while keeping the value of HRC hardness in a range of 51 to 54, thereby obtaining harmonization between a reduced abrasion and an increased bending strength. Namely, a metal forming of a rack bar according to the present invention is done while executing a repeated and alternate introduction of the mandrel into the pipe shaped blank. The number of reciprocations of the mandrel is 12 or more. In this case, the die is subjected to an outwardly expanded force each time a widened head portion of a mandrel is passed. In other words, the die is subjected to a wave transmission type load of 12 times or more. Under such a wave transmission type load, the die 26 is urged to a depression force, which cause the die to be subjected to a bending moment. In order to allow the die to be endured to the repetition to the bending, it is necessary that the toothed die 26 have a desired degree of toughness. In order to do this, the heat treatment of the die 26 is such that the value of HRC hardness is in a range of 51 to 54, which is softer than the hardness of a usual type of a die for effecting a metal forming. As a result, the toothed die 26 can have a sufficient degree of toughness, which allows the die to be endured to the repeated application of the wave like transmission of the load. Furthermore, the toothed die 26 has, on one hand, a desired degree of an ant-abrading performance since a reduced friction is obtained during the execution of metal forming by an insertion of a mandrel according to the present invention.

From an opened position as shown in FIG. 6A, the upper and lower dies 12 and 14 are moved toward each other to a closed position as shown in FIG. 6B. In this closed position, the blank pipe is, at it upper part 18-1 facing the upper die 12, flattened to an odd-shaped cross section. The flattened pipe 18 is, then, subjected to a metal forming process for obtaining a rack bar. As shown in FIG. 2, the die 10 has, merely, a length, which is shorter than one half of the length of the blank pipe 18 of the circular cross sectional shape. Furthermore, the blank pipe 18 has an end 18A, which is flashed with a longitudinal end of the die 10 and an opposite end, which is projected from the opposite longitudinal end of the die 10. However, the upper die 12, i.e., the toothed die 26 is, at a position faced with the lower die 14, formed with toothed portions 12-1, which extends longitudinally except at locations adjacent the end surfaces of the die assembly 10. As a result, under the closed position of the die assembly 10, the left ends 18A and the right end 18B of the blank pipe 18 are prevented from being flattened, so that the circular cross sectional shape at the ends 18A and the right end 18B is maintained.

In the embodiment of the present invention as explained with reference to FIGS. 2 to 6, the flattening of the upper surface of the blank pipe 18 on which the rack teeth are formed is obtained when the upper and lower dies 12 and 14 are combined, i.e., the die assembly 10 is closed. Namely, upon the closure of the die assembly 10, the toothed portion 12-1 of the upper die 12 is located at a distance from the bottom surface of the recess of the lower die 14, which is larger than the half of the diameter of the blank pipe 18. As a result of this, the blank pipe 18 is, at its upper portion 18-1, the collapsed or flattened by the engagement of the toothed portion 12-1 with the pipe 18, as illustrated in FIG. 6B. As a result, a subsequent metal forming process for obtaining a rack bar can be commenced while keeping the closed position of the die assembly 10. In other words, "seamless" operation from the pipe flattening to the rack bar forming can be realized according to the present invention. Furthermore, the initial clamping operation is only needed, which is advantageous from the viewpoint that a chance of an occurrence of a damage of the work by the clamping is eliminated. It true that the execution of the flattening by the use of the die assembly 10 for the metal forming process may likely cause the precision to be reduced in comparison with the a die for exclusive use for flattening purposes. It is, however, the inventor's finding that any actual problem will not occur so long as a required level to the precision is not so high.

Figure 7A:
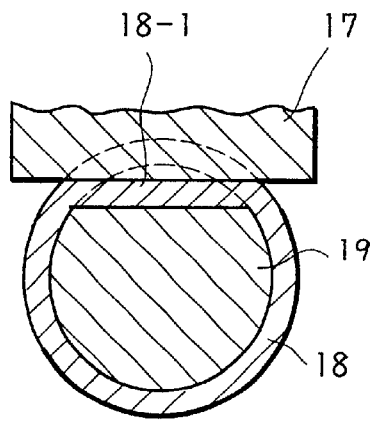
FIG. 7A illustrates a modified device for effecting a flattening a blank pipe.
Figure 7B:
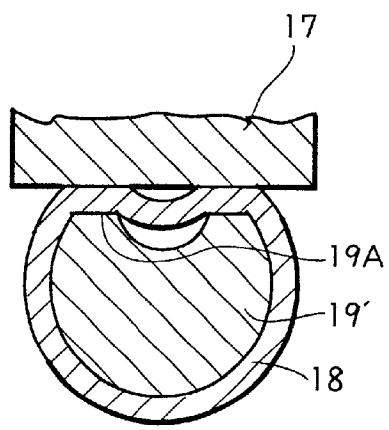
FIG. 7B illustrates further modified device for effecting a flattening a blank pipe.

FIGS. 7A and 7B illustrate examples of flattening of the pipe by a flattening die for the exclusive use. In an example in FIG. 7A, at a first stage of the flattening, a stopper 19 having a top flattened surface is inserted to the blank pipe 18. At the second stage, a press die 17 is moved to the pipe 18, which causes the latter to be fully flattened at the top portion 18-1 where a rack is to be formed unlike a centrally recessed shape in the first embodiment in FIG. 6B. The fully flattened shape in this modified embodiment can prevent a non-uniform metal flow, thereby enhancing the precision of the rack bar as produced.

FIG. 7B illustrates a further modification wherein a stopper 19' is used for executing the flattening of the blank pipe. Namely, in this further modification, the stopper 19' is, at its transverse cross section, provided with side projections 19A. As a result, a cross sectional shape of the flattened blank pipe 18, which is, in its transverse cross section, transversely extended.

Figure 6C:
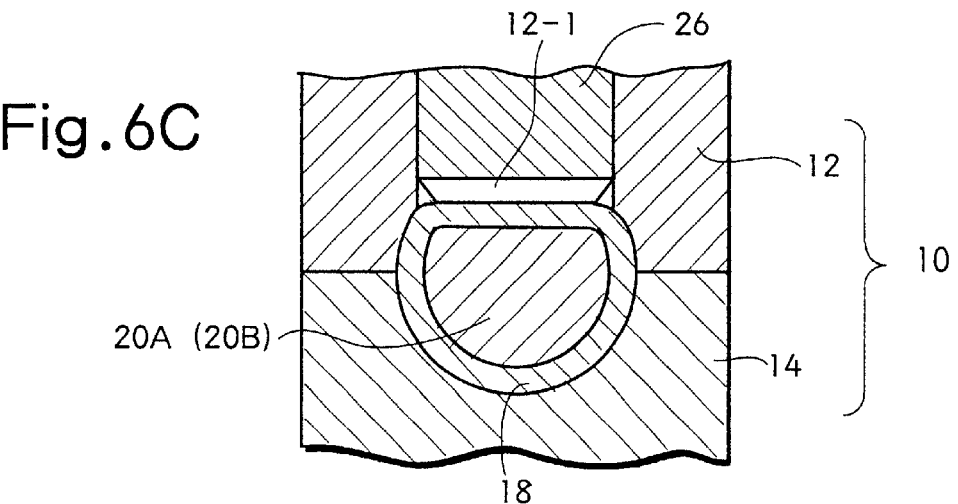
FIG. 6C illustrates an enlarged cross sectional view of the die assembly when a mandrel is inserted to a blank pipe held by the die assembly.

Again in FIG. 2, the partially flattened pipe 18, which is held between the split die members 12 and 14, is subjected to a metal forming process according to the present invention (step P3 in FIG. 1). Now, a detail of the rack formation under the metal forming principle will be explained. In FIG. 2, astride the die assembly 10 in which the partially flattened pipe 18 is held an axially opposite pair of mandrels 20A and 20B are arranged. Each of the mandrels 20A and 20B has a transverse cross sectional shape which corresponds to that of the partially flattened blank pipe 18 as shown in FIG. 6c. As shown in FIG. 2, the mandrel 20A (20B) is, at its leading end, formed with a guide portion 20-1, which assists the mandrel in being smoothly introduced into the pipe 18. At the rear side of the guide portion 20-1, the mandrel 20A (20B) is formed with a taper portion 20-2, which is followed by a first radially enlarged portion. Upon the penetration of the mandrel 20A (20B) into the pipe 18, the taper portion 20-2 is engaged with the flattened portion 18-1 of the pipe 18. As a result, plastic deformation occurs so that the metal flows into the recesses between the toothed portions 12-1 of the toothed die 26. As result, teeth, corresponding to the toothed portions 12-1 on the die 26, are created on the flattened portion 18-1 of the blank pipe 18. In the embodiment as shown in FIG. 2, the mandrel 20A (20B) is, at location downstream from the first radially enlarged portion 20-3, formed with a tapered portion 20-4, which is followed by a second radially enlarged portion 20-5. As a result, sequential, two or multi stage metal flows are obtained by a single penetration of the mandrel 20A (20B).

In FIG. 2, the mandrel 20A on the left-hand side is in a condition that its first time penetration into the blank pipe 18 has just been initiated. The penetration of the mandrel 20A is continued until a condition is obtained that the second radially enlarged portion 20-5 passes the end of the flattened part 18-1 of the blank pipe 18 in the right-hand side. Then, the mandrel 20A effects a return movement until a condition is obtained that the mandrel 20A is fully withdrawn from the pipe 28.

In FIG. 2, an insertion of the right-hand mandrel 20B into the blank pipe 18 can be commenced prior to the completion of the return movement (withdrawal) of the left-hand mandrel 20A from the pipe 18. The movement of the right-hand mandrel 20B is continued until the latter passes the left-hand end of the flattened 18-1 of the blank pipe 18. In the similar way as explained with reference to the left-hand mandrel 20A, the insertion movement of the mandrel 20B causes a metal flow to be obtained by its radially expanded portions. Then, the right-hand mandrel 20B effects its return movement in the right-hand direction in FIG. 2. Prior to the completion of the return movement of the right-hand mandrel 20B, the insertions movement of the left-hand mandrel 20A is commenced.

In the above mentioned operation of the mandrels 20A and 20B, the insertion movement of one of the mandrels 20A and 20B is commenced prior to the completion of the return movement of the other mandrel. In other words, there is an "overlapping" between the insertion movement of one of the mandrels 20A and 20B and the return movement of the other mandrel. The alternate inserting movements between the mandrels 20A and 20B while effecting above mentioned "overlapping" are repeated for a predetermined number. As a result of the execution of such alternate insertion movements between the mandrels 20A and 20B, the material contacting with recessed portions of the die 26 are expanded outwardly while the material contacting with the toothed portion of the die 26 is pressed inwardly. In case where a rack bar of a tooth height of 3.5 mm of a desired precision is to be formed, the outward expansion must be 1.75 mm and the inward pressing must be 1.75 mm. The inventor has found that, from the view point of obtaining an increased precision of the rack bar as fine as 32 μm under the metal forming processing using the mandrels 20A and 20B and the toothed die 26, it is very important that, during the execution of a metal forming process, the following requirements are satisfied, that are (1) a quasi-warm working condition or semi-warm working condition is maintained, which is around a work-softening point of a temperature about 200° C. under a heat as generated by the metal forming processing, (2) an occurrence of an age-hardening is prevented and (3) a deviated flow of metal is restricted or cancelled. Now, details of these requirements will be discussed here in below.

Figure 8:
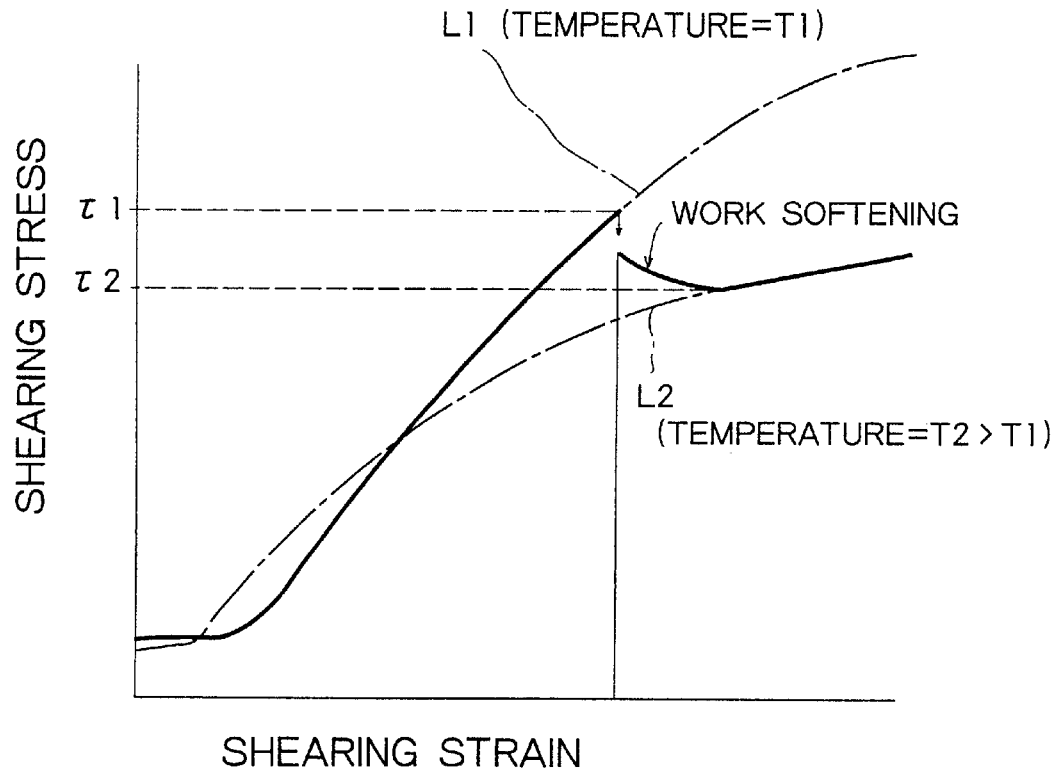
FIG. 8 is a graph illustrating relationship between shearing strain and shearing.

The penetration of the mandrels 20A and 20B to the blank pipe 18 causes the metal to be flown into cavities between the toothed portions 12-1, thereby forming, on the blank pipe 18, teeth which are complimentary with the toothed portions 12-1 on the die 26. Such a metal forming or forging process causes the heat to be accumulated, thereby increasing the temperature of the material. It is quite usual that the metal forming process causes the material to be hardened. In other words, a phenomenon is usually generated wherein shearing stress is increased in accordance with an increase in the shearing strain. Such a phenomenon is called as a work hardening. However, the metal forming may sometime cause a phenomenon to be generated wherein the shearing stress is decreased in accordance with an increase in the shearing strain when the temperature of the material is increased while subjecting the material to a deformation at a condition around a critical shearing strain. This latter phenomenon is called as a work softening. Namely, in FIG. 8, an abscissa designates a shearing stress and an ordinate designates a shearing stress. A relationship between the shearing strain and shearing stress under a constant temperature $T_1$ is illustrated by a line L1. As illustrated by the line L1, an increase in the shearing strain causes, initially, the shearing stress to be linearly increased. The increase in the stress is, at a stress value of τ1 (so-called critical shearing stress), slow down due to an occurrence of a cross slip. At an area around the critical shearing stress, an increase in the temperature from $T_1$ to $T_2$ causes the stress to be reduced. A further stretching causes a phenomenon to be generated wherein the shearing stress is decreased in accordance with the increase in the stress. Finally, the searing stress is increased along the curve $L_2$, which is a stress-strain relationship at the temperature $T_2$. Such a phenomena of a decrease in the stress in accordance with the increase in the strain at an increase temperature at the relatively progressed state of the deformation is called as a work-softening phenomenon. According to the present invention, the temperature of the material as generated under the execution of the metal forming process is maintained at the area around the work softening point of about 200° C., while a repeated insertion of the mandrel is done. As a result, a work hardening of the material is prevented and, rather, a flowability of the material is increased. As a result, irrespective of a production of the rack bar under the forging principle, an increased precision as fine as an order of microns is obtained. In this specification, such a metal forming process at the area around the work softening point of a temperature about 200° C. as generated substantially solely by the execution of the metal forming process without imparting any outside heat is referred as a quasi-warm or semi-work working process. An exact area of the values of the temperature suitable for an execution of such a quasi-warm working process depends, of course, on the types of the material. However, for typical steel material for the production of a rack bar, the temperature is around 200° C. In order to keep a condition for the quasi-warm processing, it is important that any outside heating device is unnecessary. A measure is, however, essential for preventing the die assembly as well as the mandrel from being excessively cooled. Namely, during the execution of the repeated insertion process, upon the opening of the die after the completion of the operation, an ejection a liquid is usually done not only for the cooling but also for a cleaning of the die assembly. Such an ejection of the washing and cleaning liquid may cause the die assembly to be cooled. However, the ejection of the liquid is only once for the repeated insertion operations of a number of ten or so, thereby preventing the die assembly as well as the pipe material from being overly cooled. On the other hand, for the mandrel, it is usual that it is always fed by the lubrication liquid, which may, however, cause the material to be excessively cooled. Thus, a heat radiation control including a limited cooling or lubrication only at the waiting operation after the retraction from the die assembly is needed by which the material is kept under the temperature at the quasi-warm processing process. Under these circumstances, it is important to take a measure for keeping a desired degree of lubrication of the mandrel. In view of this, a bonderizing as well as a surface hardening of the mandrel are advisable. In addition, on an outer surface of the mandrel, small oil pots can be formed for causing the latter to function as an oil reservoir. Furthermore, lubrication oil of an increased viscosity factor can be used.

Furthermore, according to the present invention, the mandrels 20A and 20B are subjected to the overlapping operation. In other words, after the commencement of the return movement of one of the mandrels 20A and 20B and prior to the finish of its return movement, a movement of the other mandrel for effecting an insertion operation is commenced. Such an overlapping operation is, first, important from the viewpoint that the quasi-warm or semi-warm processing condition is maintained. Namely, an excessive temperature drop will be arisen if an insertion of a mandrel is waited until completion of the withdrawal of a previously inserted mandrel. The overlapping operation according to the present invention is, also, important from the viewpoint that a time shortening is obtained for preventing an age hardening phenomenon from being generated. Namely, an execution of a metal forming process causes the material to be usually subjected to an age hardening. Such an age hardening is, usually, commenced within a time period as short as 1 or 2 minutes. In usual construction of a power steering mechanism for an automobile, the length of the rack bar is in a range between 600 to 800 mm. In order to produce such a rack, a mandrel of a length as long as 1,000 mm is needed. In such a length of the mandrel, an age-hardening phenomenon may inevitably be arisen so long as an insertion of the second mandrel is commenced after the completion of the withdrawal of the first mandrel. The above mentioned overlapping operation of the mandrels 20A and 20B can effectively control the age-hardening phenomenon which may occur within a time of minutes. According to the present invention, the mandrel overlapping operation is combined with the quasi-warm working. As a result, an increased flowability is obtained during the execution of the metal forming process by an insertion of the mandrels 20A and 20B to the blank pipe 18. Such an increase flowability of the material is, according to the present invention, combined with the repeated insertion of the mandrels 20A and 20B. As a result, an increased precision of the product (rack bar) as fine as the order of 32μ irrespective of a fact that the rack bar according to the present invention is essentially a forged product.

Figure 9A:
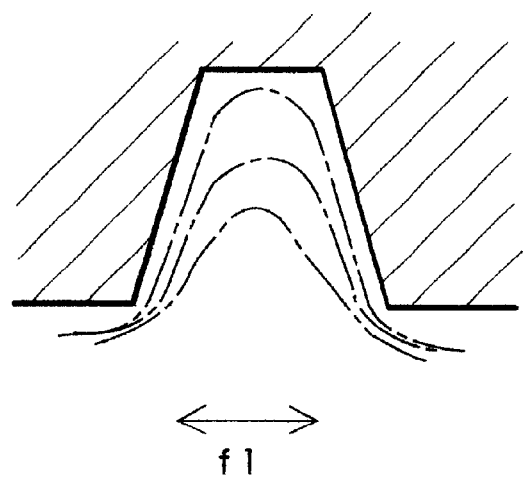
FIG. 9A illustrates a flow pattern of material during a rack bar forging process by an insertion of a mandrel to a blank pipe in the present invention.
Figure 9B:
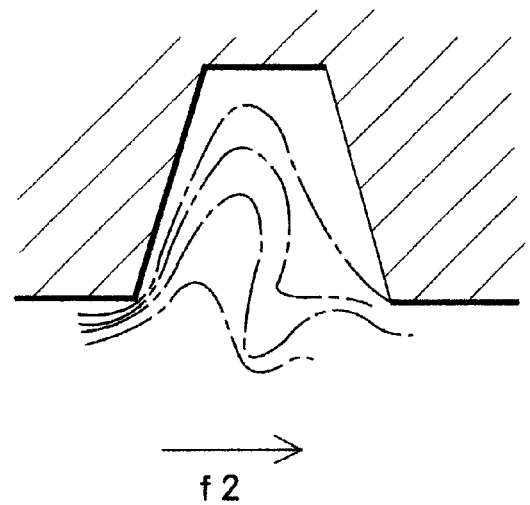
FIG. 9B illustrates a flow pattern of material during a rack bar forging process by an insertion of a mandrel to a blank pipe in a prior art.

In addition to the advantages of the above defined quasi-warm or semi-warm working processing as well as a restriction of the age-hardening phenomenon, the alternate insertion of the left-hand and right-hand mandrels 20A and 20B can advantageously correct any segregation in the flown material. In other words, as a result of alternate insertions between the left-hand and right-hand mandrels 20A and 20B, an uniformly distributed flow of the metal is obtained in the recesses of the toothed die 26, thereby obtaining forged products (rack bars) of an increased precision. FIGS. 9A and 9B show schematically flow patterns of material during the metal forming process which are interpreted from X-ray cross-sectional photographs of a tooth of a rack bar as obtained by the metal forming process according to the present invention. In FIG. 9A, where the mandrel is subjected to an alternate reciprocation as shown by an arrow $f_1$, an symmetrical flow pattern is obtained. In FIG. 9B, where the mandrel is subjected to an insertion in a single direction as shown by an arrow $f_2$, a flow of the material is non-symmetrical and a rolled flow of the material is obtained. In the non-symmetrical flow of the material as shown in FIG. 9B, non-uniform residual stress is likely in the produced rack bar, resulting in a location to location non-uniform value of spring-back amount, which may cause the precision as well as the strength of the teeth to be reduced. According to the present invention, a means is provided for preventing such a non-uniform flow of the material is from being occurred. As a result of an uniform flow of the metal according to the present invention, the above problems in the prior art can be suitably overcome.

In summary, the forged type of the rack bar formation according to the present invention includes the following important steps that are:

(1) keeping a quasi-warm processing condition under a heat as generated by a metal forming operation;

(2) preventing an age-hardening from being generated, and;

(3) correcting an off-centered flow (segregation) of the material. As a result, a precision of a produced rack bar as fine as 32μ can be attained irrespective of a fact that the rack bar is obtained under essentially metal forging principle.

In the above operation, the blank pipes 18 before being subjected to the forging process, i.e., metal forming process can be under a cold state, i.e., room temperature. In this case, the commencement of the repeated mandrel insertion causes a quick rise in the temperature due to the heat generated by the metal deformation. As already explained, a measure is provided for keeping this temperature, which is, of about 200° C. in the semi-warm working condition.

In the actual practice of the present invention, in place of staring from a room temperature of the blank pipe 18, it is also possible to provide a heating for increasing positively the initial temperature prior to the commencement of the mandrel insertion process. Such a positive initial heating is desirable from the viewpoint to quickly attain the semi-warm working condition around 200° C. in the semi-warm working condition as created by the heat under the metal plastic deformation.

From the viewpoint of a working of the present invention, the blank pipe 18 may, desirably, be a seamless type. However, the present invention can also be, practiced when the blank pipe 18 is of a pipe with a seam. In the case of the pipe with a seam, the latter is preferably located opposite the toothed portion 12-1 of the upper die 12, i.e., on the semi-circular surface 14-1 of the lower die 14 in FIG. 6. In case of a rack bar, the teeth are located only on a side of the pipe, a circumferential extension of which is smaller than 180 degree. In view of this, an arrangement is not so difficult, wherein a flattening of the blank pipe as a preforming process can be done while the seam is located opposite the position to be subjected to the following flattening process. However, the working of the present invention is not limited to the above arrangement. In an arrangement where the seamed portion is located opposite the toothed die 26, a strong reaction force may be generated at the seamed portion of the blank pie contacting with the lower die 14 at the semi-circular surface 14-1 in FIG. 6A. However, the pipes are subjected to a special forming process such as an ironing for allowing the pipes to withstand the above mentioned reaction force generated in the seamed portions.

Figure 10A:
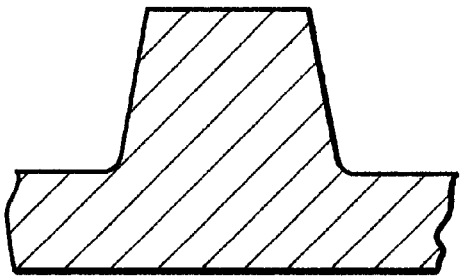
FIG. 10A illustrates a schematic cross-sectional view of a tooth in a forged rack bar as obtained by an insertion of a mandrel to a blank pipe in a prior art.
Figure 10B:
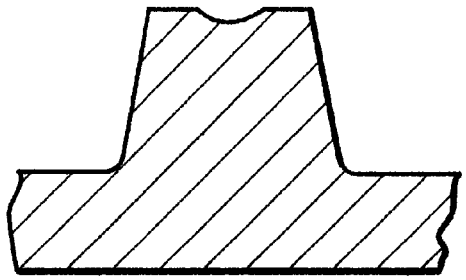
FIG. 10B illustrates a schematic cross-sectional view of a tooth in a forged rack bar as obtained by an insertion of a mandrel to a blank pipe in the present invention.

In the above explanation, the metal forming in the die assembly or die set 10 by the insertion of the mandrels 20A and 20B is a so-called fully filling type formation where the material is fully filled in the recessed of the toothed die 26. Namely, FIG. 10A illustrate a cross-sectional shape of a tooth of a rack bar as obtained by the metal forming of fully filled type. In this case, a metal forming force must be generated, which is a 1.1 to 1.3 times of a compression force as generated in the material in order to allow the latter to be subjected to a metal flow. However, this solution likely causes the tooth formation tools to be easily wore or damaged, thereby increasing the running cost. Contrary to this, FIG. 10B illustrates a cross-sectional shape of a tooth of the rack bar as obtained by a die assembly wherein a partially filled type metal forming is done. In this latter partially filled type metal forming, 10 to 30% reduction is obtained in the compression force over the fully filled type metal forming in FIG. 10A. As a result, during the rack forming under the partially filled type principle, a recess 18-3 may necessarily be generated at the central portion of tips of each of teeth of the rack bar. However, by the provision of the recess 18-3 at the top of the tooth, a reduction in a contact length is not substantial over that of a tooth as obtained by the fully filled type. A small reduction in a bending strength is inevitable, which does, however, not provide any substantial problem due to the fact that the teeth strength in the rack bar as obtained by the metal forming process 24 is 2 to 3 times higher than that obtained by the machined process. In place of 10 to 30% reduction in the load by the employment of the partially filled type as illustrated FIG. 10B, an increase in service life of 10 to 100 times is obtained, which results in a substantial reduction in running costs.

Referring back to FIG. 2, a vertical shifting operation of the mandrels 20A and 20B will now be explained. On the left side of the die assembly 10, a set of vertically spaced mandrels are provided, although only two mandrels 20A and 20A' are shown in FIG. 2 for the sake of the simplicity. In the similar way, on the right side of the die assembly 10, a set of vertically spaced mandrels 20B and 20B' is provided. Such an arrangement of vertically spaced mandrels is for a progressively increased degree of working. In other words, along the shift direction, i.e., the vertical direction, the working diameters of the mandrel are progressively varied (increased). These mandrel in the shifting direction (vertical direction) are arranged on respective left-hand and right-hand stackers not shown in FIG. 2 in such a manner that a working is done while vertically shifting the mandrel stackers. Namely, a first stage working is done wherein the mandrels 20A and 20B are alternately inserted. After the completion of the first stage working by the mandrels 20A and 20B, an upward movement of holders of the respective left-hand and right-hand stackers as shown by arrows a is executed in such a manner that the mandrels 20A' and 20B' for the second stage working is aligned with the blank pipes 18. Then, the second stage working is done wherein the mandrels 20A' and 20B' are alternately inserted to the blank pipes 18. In the similar way, the working of later stages is done while executing the vertical shifting of the mandrels. Such a multi-stage working while changing progressively the working diameter is desirable in that a deeply recessed pattern of an increased precision can be obtained on a blank pipe of a reduced wall thickness.

Figure 11A:
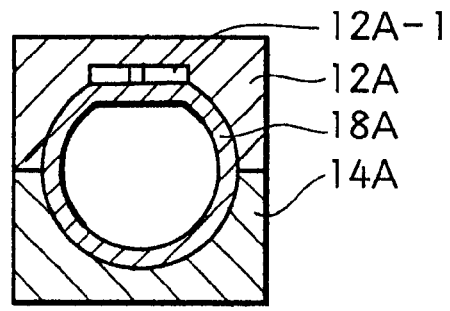
FIG. 11A illustrates an example of a cross sectional shape of a pipe shaped product according to the present invention.

FIGS. 11A to 11D illustrate various odd-shaped blank pipes and constructions of split die members for imparting recessed patterns thereon. FIG. 11A illustrates a blank pipe 18A as a circular pipe having a flattened upper side as similar to the one as already explained with reference to FIGS. 2 to 6. The die assembly is constructed by an upper die 12A and a lower die 12B. The upper die 12A is formed with recessed or toothed portions 12A-1 faced with the flattened part of the blank pipe 18A. As a result of an insertion of the mandrel, teeth complimentary with the shape of the recessed portions 12A-1 are formed on the flatten side of the blank pipe 18A.

Figure 11B:
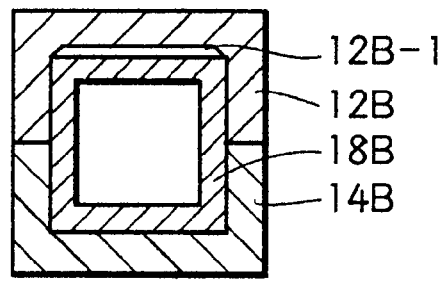
FIG. 11B illustrates another example of a cross sectional shape of a pipe shaped product according to the present invention.

FIG. 11B illustrates a blank pipe 18B of a rectangular cross sectional shape, which is clamped between an upper die 12B and a lower die 14B. The upper die 12B is formed with recessed or toothed portions 12B-1 on a side of the blank pipe 18B. As a result of an insertion of the mandrel, teeth complimentary with the shape the shape of the recessed portions 12B-1 are formed on the side of the rectangular blank pipe 18B.

Figure 11C:
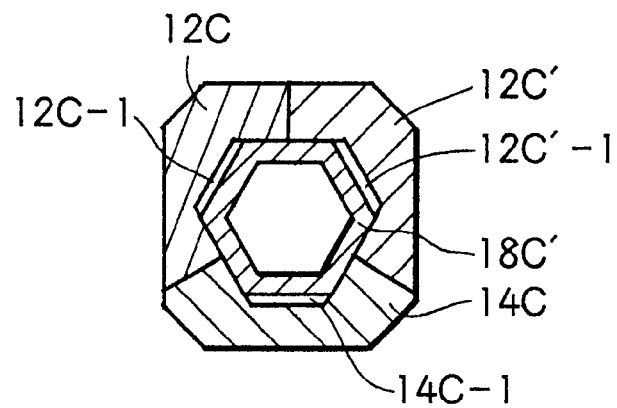
FIG. 11C illustrates a further example of a cross sectional shape of a pipe shaped product according to the present invention.

FIG. 11C illustrates a blank pipe 18C of a hexagonal cross sectional shape. The die assembly includes three split die members 12C, 12C' and 14C. These split die members 12C, 12C' and 14C are, at their inner surfaces, formed with recessed or toothed portions 12C-1, 12C'-1 and 14C-1. As a result of an insertion of the mandrel, teeth or recesses of a shape complimentary with the shape of the recessed portions 12C-1, 12C'-1 and 14C-1 are formed on alternate three sides of the hexagonal blank pipe 18C.

Figure 11D:
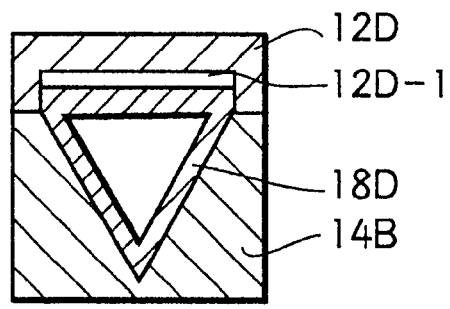
FIG. 11D illustrates a further other example of a cross sectional shape of a pipe shaped product according to the present invention.

FIG. 11D illustrates a blank pipe 18D of a triangle cross sectional shape. The die assembly is formed by an upper die 12D and a lower die 14D. The upper die 12D is formed with recessed or toothed portions 12D-1 on an inner side of the upper die 12D. As a result of an insertion of the mandrel, teeth or recesses of a shape complimentary with the shape of the recessed portions 12D-1 are formed on a side of the triangle blank pipe 18D.

Figure 12:
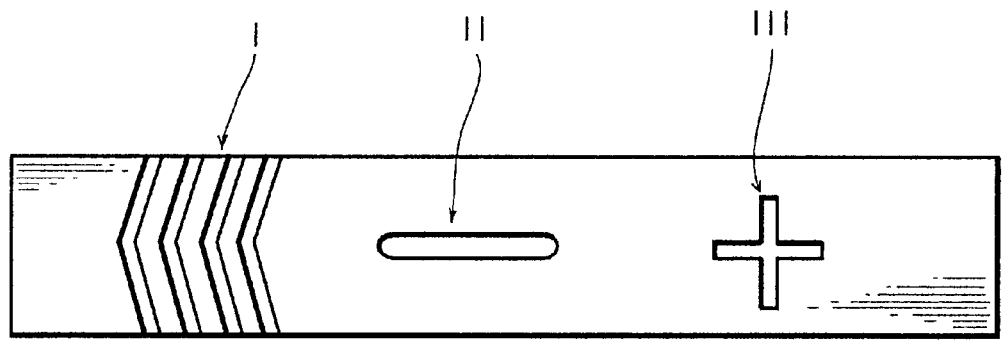
FIG. 12 illustrates various projected or recessed patterns as obtained by the present invention.

FIG. 12 illustrates variations of projected or recessed patterns on the flattened surfaces 12A-1, 12B-1, 12C-1 and 12D-1 of the blank pipes 18 in FIGS. 11A to 11D, respectively. The pattern I shows a series of bent teeth, the pattern II illustrates a key shaped projection and the pattern III illustrates a cross shaped projection. It will be clear to those skilled in this art that many other patterns can be formed on blank pipes by a metal forming method according to the present invention.

Figure 13:
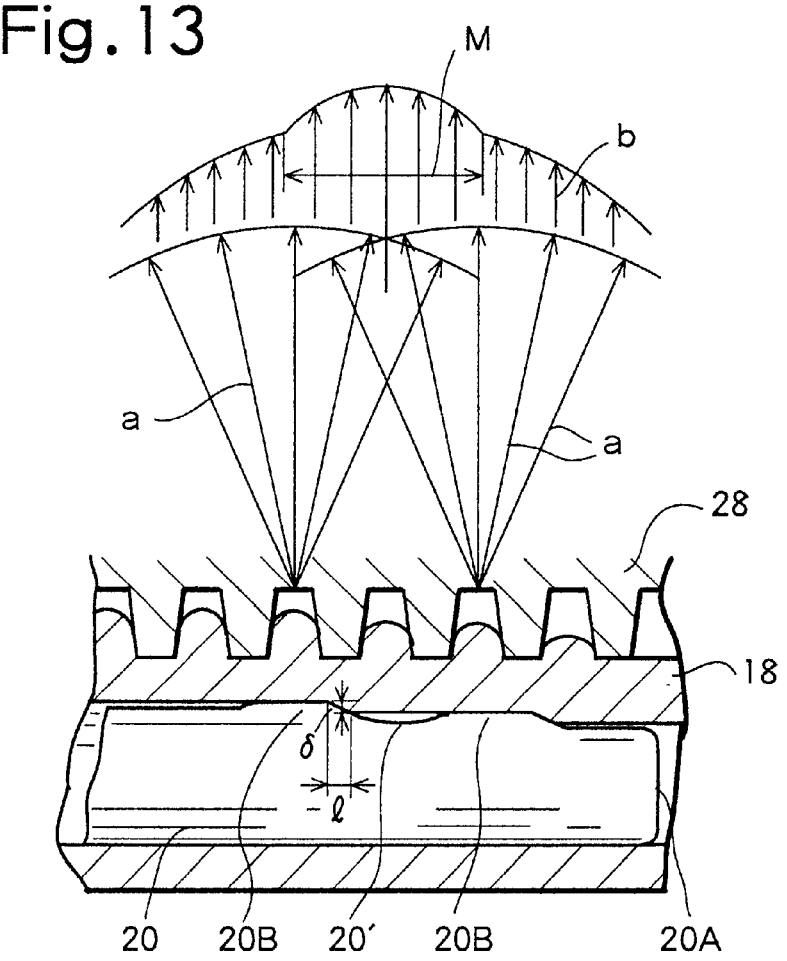
FIG. 13 illustrates a detailed construction of a mandrel having two operating heads according to the present invention together with a view illustrating a transmission of force to a die.

Now, details of a construction of the mandrel will be explained. Key factors for the rack bar forging by the mandrel are a number of working stages, a flowability of the material, and a wave like transmission of compression force as generated during the execution of the mandrel insertion process. First, a radially expanded force as generated during the movement of the mandrel will be discussed. In FIG. 13, such a radially expanded force is generated under a wedge action of an inclined surface at the front side of the radially expanded part or parts (an operating head or heads of the mandrel). In FIG. 13, the mandrel 20 is shown so that it has two radially expanded parts 20B. In this construction of the mandrel, a radially expansion force by each of the mandrels 20B is expressed by $$P \times l/\delta,$$

where P is an axial insertion force, l (mm) is an effective length of the inclined surface of the operating head δ (mm) is a radial expansion length. An excessively increased value of amplification ratio l/δ causes the expansion ratio to be excessively increased, resulting in a highly increased value of the clamping force in the die assembly. Contrary to this, an excessively reduced value of amplification ratio l/δ causes the expansion ratio to be excessively reduced, which causes the axial insertion force to be increased to a value which is larger than a buckling limit of the mandrel. Therefore, it is necessary that the value of l/δ is adjusted to obtain a desired harmony between the clamping force as well as a radial expansion force. It was the inventor's finding that a desired value of l/δ is around 100. In an actual construction of the mandrel having two radial enlarging portions or mandrel operating heads 20B as shown in FIG. 13, where the value of l was 3.5 mm and the value of δ was 0.03 mm, the value of l/δ was 117. In this case, the value of the mandrel insertion pressure is 4.4 tf. Thus, for each of two radial enlarging parts 20B, the radial expansion force F=(4.4/2)×117=257 tf.

During execution of the mandrel insertion, oiling of the mandrel is necessary for preventing lubrication from being worsened. The enlarging head or the operating head 20B is made contact with the inner diametric surface of the blank pipe 18, while an expansion is done at the inclined surface. As a result, a reaction force is generated, resulting in the mandrel to be highly radically outwardly forced. Simultaneously, the metal material at the enlarging head 20B is forced to flow to any gap as existed. As a result, the second stage enlarged head 20B for a re-striking operation is apt to be highly stressed at its entire portion, which likely cause the oil film to be broken. In particular, an usual mirror like finishing on the enlarged head 20B is easy for an oil film to be broken. To combat such an oil film breakage, a fine roughness rather than the mirror like finishing can be formed on the surface of the enlarged head 20B. Namely, the lubricant is held in the roughened surface, which is effective for preventing the oil film from being easily broken. In order to obtain such a roughened surface, a machining by a lathe is done so that a fine spiral groove by its cutting tool is formed on a peripheral surface. Any alternative measure including a mechanical or chemical treatment can be employed so that a roughness of 2 to 3 $\mu$m is formed on the peripheral surface of the mandrel.

In FIG. 13, the mandrel 20A or 20B is, at a portion 20' downwardly adjacent the expansion head 20B, a radially reduced, thereby forming thereat a oil reservoir chamber. In a well known manner, a lubricant is applied to the mandrel for it lubrication and cooling during the execution of the mandrel insertion. Such a lubricant is held at the reservoir chamber formed at the rear side of the expansion head 20B. As a result, during the execution of the forward movement of the mandrel, sucking of the lubricant from the reservoir to the expansion head 20B is suitably done. The degree of the radius reduction at the portion 20' adjacent the expansion head 20 is such that a desired oil reserving function is obtained even in a situation of a so-called spring back phenomenon where the inner diameter is reduced as a result of an occurrence of a so-called spring back operation after the passage of the enlarged head 20B.

In FIG. 2, the mandrel 20A has, at a root portion, a diameter which corresponds to the diameter of the blank pipe 18 at a circular portion 18-1. Namely, a fully inserted position of the mandrel to the blank pipe 18, the latter is supported at its full circumference, thereby providing an increased resistance to the buckling.

In FIG. 13, the mandrel with two enlarging heads or operating heads 20B is shown. Such a provision of a plurality of enlarging heads 20B is advantageous from the view point that an even distribution of a distortion force in the mandrel is obtained, resulting in an increased service life of the mandrel and the die assembly. Namely, an execution of an insertion forging of a rack bar by a mandrel with only one enlarged head would cause a large expansion force to be concentrated at a narrow area corresponding to a width of the enlarged head. A wave like transmission of the strain is occurred in accordance with the progress of the mandrel insertion process. In case of 6 time repetition of insertions of the mandrel at each end of the blank pipe 18, the total number of wave like strain as generated is 12, which likely causes the die assembly to be prematurely damaged. According to the present invention, a plurality of enlarged heads 20B of a number of 2 to 6 are arranged spaced along the length of the mandrel, thereby obtaining ½ to ⅙ reduction of expansion force. Such a reduction in the expansion force can reduce the bending force or a depression due to a compression applied to the die assembly in response to a wave like transmission of the strain as generated by the repeated insertion of the mandrel 20A and 20B to the blank pipe 18. In case of the mandrel having the two enlarged heads 20B as shown in FIG. 13, a insertion force of 4.4 tf at the mandrel is reduced to 4.4/2=2.2 tf at each of the enlarged heads 20B.

Figure 14:
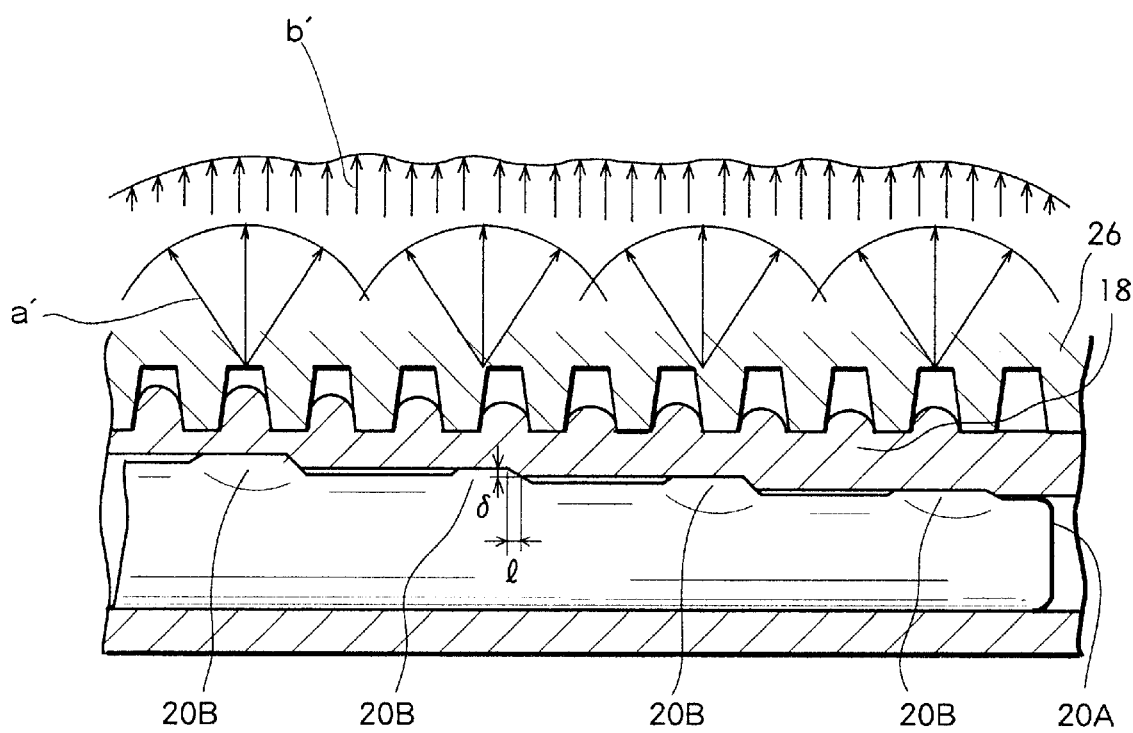
FIG. 14 is similar to FIG. 13 but illustrates another construction of a mandrel having four operating heads according to the present invention.

As explained above, even the provision of two enlarging heads 20B can obtain ½ reduction of the expansion force per a single enlarging head, which, however, still may cause the service life of the die assembly to be shortened due to the occurrence of the wave like transmission of the strain along the length during the mandrel insertion operation. In order to combat to this problem, the mandrel in FIG. 14 is provided with four enlarging heads 20B. By this solution, a more even distribution of the load along the length is obtained. Namely, with respect to conditions that l=1.5 mm and δ=0.015 mm, the value of the ratio l/δ=100. In this construction of the mandrel of four heads 20B, with respect to the insertion force of 4.4 tf, the expansion force F at each enlarging head 20B will be reduced to 1.1×100=110 tf.

Now, a distance between the enlarging heads 20B, which are adjacent with each other, will be discussed. The penetration of the mandrel 20A or 20B to the blank pipe 18 causes the toothed die 26 to be subjected to the above mentioned wave like transmission of an enlarging force, resulting in a generation of a bending load in the toothed die 26. The bending load is transmitted to the toothed die 26 at a range of an angle (solid angle) of about 45 degree. In FIG. 13, diverted lines a with arrows illustrate schematically the transmission of the load from the enlarging part, which occurred in the solid angle. When a distance between the adjacent enlarging heads 20B is too small, a situation may be arisen that the loads transmitted from the adjacent enlarging heads are superposed under a particular relationship with respect to the height of the toothed die 26, resulting in a highly increased load as generated in the toothed die 26 as shown by arrows b, which may causes the service life of the toothed die 26 to be shortened. FIG. 13 illustrates a schematic illustration of a superposition of loads at a region of length M of the bottom of the toothed die 26. FIG. 14 illustrates a mandrel with four enlarging heads 20B at a suitable pitch, which can prevent the superposition of the load at the bottom of the toothed die 26 transmitted as shown by arrows a' from the respective enlarging heads 20B at a transmission angle. In this arrangement, an even distribution of the force applied to the die assembly as shown by arrows b' is obtained. In view of the value of the angle of load transmission as shown by arrows a' which is about 45 degree, it will be desirable that the pitch of the enlarging head 20B is roughly equal to the height of the toothed die 26.

In case of the mandrel with two enlarging heads 20B as shown in FIG. 13, where the enlarging head pitch is 30 mm and the height of the toothed die is 60 mm, the load receiving length at the bottom of the toothed die 26 will, roughly, be 30×2=60 mm since the load transmission angle is 45 degree. Furthermore, since the load as generated at the each enlarging head 20B is, as explained above, 257 tf, the total load is 2×257=514 tf. Thus, the load per 1 mm length of the toothed die will be 514/60=8.56 tf/mm. Contrary to this, in case of the mandrel with four enlarging heads 20B as shown in FIG. 14, where the enlarging head pitch is 40 mm, the load receiving length is 40×4=160 mm. As already explained, the load at each of the enlarging heads in the construction in FIG. 14 is 110 tf, and, therefore, the total load will be 4×110=440 tf. Thus, the load per 1 mm length of the toothed die will be reduced to 440/160=2.75 tf/mm. Thus, over the construction in FIG. 13, the construction in FIG. 14 can obtain a load reduction of ratio of 2.75/8.56=0.32. Such a value of the ratio of the load reduction correspond to the difference in the service life of $10^4$ to $10^5$ on a diagram of a metal fatigue destruction curve.

Figure 15:
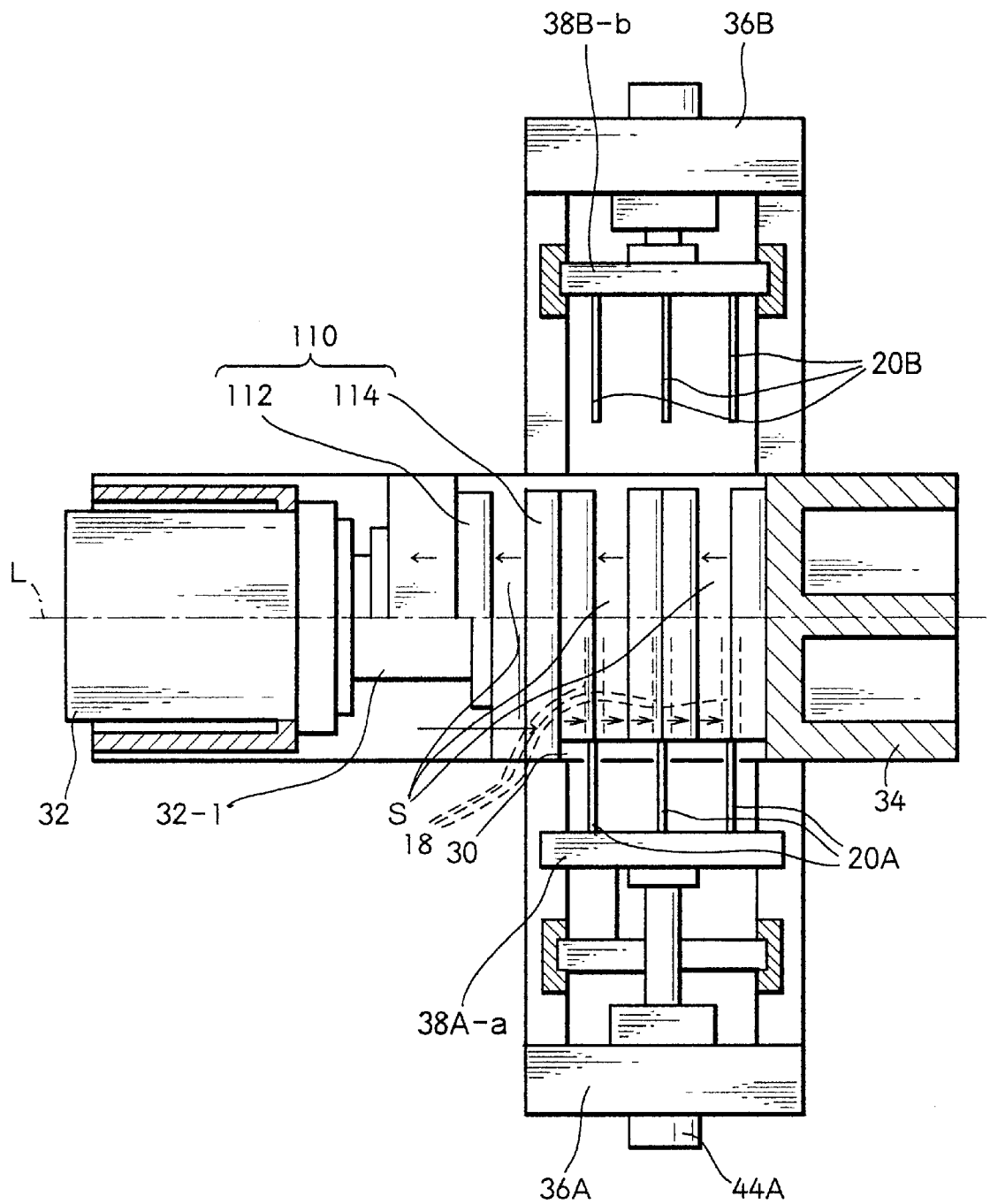
FIG. 15 is a plain view of a rack bar forging system having opposed stackers for a vertical shifting of mandrel holders with laterally adjoined die sets for holding blank pipes.
Figure 16:
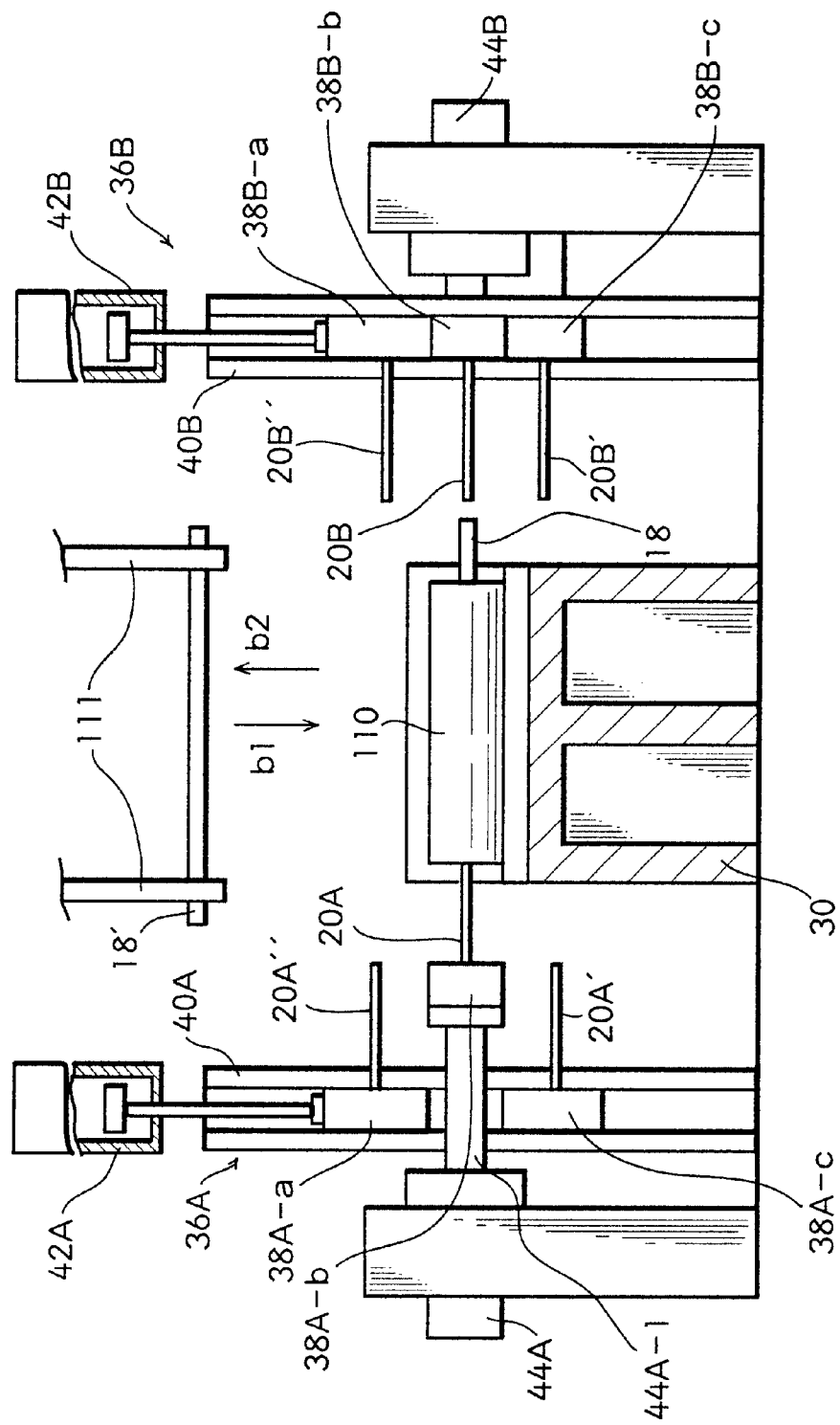
FIG. 16 is a side elevational view of the system in FIG. 15.

Referring, now, to FIGS. 15 and 16, a rack bar forging system of multi mandrel simultaneous insertion type with a vertical shifting according to the present invention will be explained. In FIGS. 15 and 16, reference numeral 30 denotes a bed, on which a plurality of die sets, each of which is of laterally split type, are arranged. These die sets are arranged as a lateral row. Each of die sets includes split die members 112 and 114. The die 112 corresponding to the upper die 12 has toothed portions corresponding to the toothed portion 12-1 in FIG. 2. Contrary to this, the die 114 corresponding to the lower die 14 in FIG. 2 has semi-circular groove for resting thereon a blank pipe, corresponding to the semi-circular groove 14-1 in FIG. 6A.

A press cylinder 32 is arranged on one side of the row of the die sets 110. A pressure-receiving frame 34 is arranged on the other side of the row of the die sets 110. The pressure cylinder 32 is provided with a piston 32-1, which cooperates with the row of the die sets in the following way. Namely, when the piston 32-1 is retracted, each of the die set 110 is under an opened condition as shown in the upper half in FIG. 15, where the split die members 112 and 114 are separated from each other so that a space S is created therebetween. When the piston 32-1 is extended out of the cylinder, a slide movement of the lateral row of the die sets 110 on the bed 30 is commenced. As a result of the slide movement, the row of the die sets 110 are sandwiched between the piston 32-1 and the frame 34 as shown in the lower half in FIG. 15. In this condition, the split die members 112 and 114 constructing each die set 110 are connected with each other in the similar way as shown in FIGS. 6B and 6C, thereby clamping a blank pipe 18 between the corresponding split die members 112 and 114.

As shown in FIG. 15, astride the row of the die sets 100, each clamping blank pipe 18, a pair of opposite stackers 36A and 36B is arranged. As shown in FIG. 16, the left-hand stacker 36A includes vertical set of mandrel holders 38A-a, 38A-b and 38A-c. In FIG. 16, only three mandrel holders 38A-a, 38A-b and 38A-c are shown for the sake of the simplicity. However, there is, of course, no intention to limit to this particular number of the holders. The stacker 36A further includes a stacker frame 40A for vertically slidably supporting the mandrel holders 38A-a, 38A-b and 38A-c, and an elevating mechanism 42A for causing the mandrel holders 38A-a, 38A-b and 38A-c to be vertically shifted in the stacker frame 40A. A well known "one touch" type connection can be employed for allowing each of the mandrel holders 38A-a, 38A-b and 38A-c to detachably hold a desired number of the mandrels 20A. Furthermore, outside the left-hand mandrel holding stacker 36A, a hydraulic cylinder 44A is provided for controlling a mandrel insertion operation. The pressure controlling cylinder 44A is provided with a piston 44A-1, which is engaged with the sequentially shifted or selected mandrel holder 38A-a, 38A-b or 38A-c. Namely, the piston 44A-1 is, first, engaged with the mandrel holder 38A-a, so that the latter is moved in the right-hand direction in FIG. 16. As a result, the mandrels (three mandrels 20A" in FIG. 15) held by the mandrel 38A-a are inserted to the axial cavities of the blank pipes 18 held by the respective die sets 110. As a result, a first stage metal forming process as explained with reference to FIG. 2 is executed in such a manner that, on the flattened side of the blank pipe 18, linearly spaced teeth corresponding the toothed portions on the toothed die 26 are formed.

After the completion of the first stage insertion of the mandrel 20A" held by the first mandrel holder 38A-a, the latter is moved in left-hand direction in FIG. 16 to a position in the stacker frame 40A. Then, the lifting mechanism 42A is operated so that one stage shifting operation of the mandrel holders in the stacker frame 40A in a vertical direction in, for example, an upward direction, which causes the piston 44A-1 to be faced with the next stage mandrel holder 38A-b. An elongation of the piston 44A-1 causes the mandrel holder 38A-b to be moved in the right-hand direction in FIG. 16, so that the mandrels 20A held by the mandrel holder 38A-c are inserted to the axial space of the blank pipes 18 held by the respective die sets 110. As a result, a second stage metal forming process is executed. After the completion of the second stage mandrel insertion, an upward shift of the mandrel holder is done for the execution of the following stage of the mandrel insertion.

The construction of the stacker 36B on the right side of the die bed 30 in FIG. 16 is the same as that of the left-hand stacker as already explained. Namely, the right-hand stacker 36B includes vertical set of mandrel holders 38B-a, 38B-b and 38B, a stacker frame 40B for vertically slidably supporting the mandrel holders 38B-a, 38B-b and 38B-c in the stacker frame 40B, and an elevating mechanism 42B for causing the mandrel holders 38B-a, 38B-b and 38B-c to be vertically shifted in the stacker frame 40B. Furthermore, outside the right-hand mandrel holding stacker 36B, a hydraulic cylinder 44B is provided for controlling a mandrel insertion operation. The pressure controlling cylinder 44B is provided with a piston 44B-1, which is engaged with the sequentially shifted or selected mandrel holder 38B-a, 38B-b or 38B-c, so that a selected mandrel holder to be moved in the left-hand direction in FIG. 16. As a result, the mandrels held by the selected mandrel are inserted to the axial cavities of the blank pipes 18 held by the respective die sets 110, thereby executing a metal forming process wherein the blank pipes are, at their flattened surfaces, formed with teeth corresponding to toothed portions 12-1 on the die 26 as explained with reference, mainly, to FIG. 2. As similar to the 33 mandrel holders in left-hand stacker 36A, the mandrel holder 38B-*a*, 38B-*b* or 38B-*c* in the right-hand stacker frame 40B is subjected to vertical shifting movement, so that a progressive or multi-staged metal forming operation is executed.

According to the present invention, a multi-staged rack bar forming process is executed while the left-hand and right-hand mandrel holders are subjected to a vertical movement. At each stage, the left-hand and right-hand mandrels are alternately inserted to the blank pipes 18 as already explained with reference to FIG. 2. In FIG. 16, after the completion of a first stage rack bar forming by the mandrels 20A" and 20B", an upward shifting of the left-hand and right-hand stackers 36A and 36B is done so that a second stage rack bar forming process is executed by the mandrels 20A and 20B. Namely, the mandrels 20A held by the mandrel left-hand holders 38A-*b* are moved in a right-hand direction by the piston 44A-1 of the insertion cylinder and are inserted simultaneously to the blank pipes 18 clamped by the respective die sets 110, which are laterally adjoined with each other. After completion of the insertion process, the mandrels 20A held by the mandrel holders 38A-*b* are withdrawn in the left-hand direction in FIG. 16. Under a suitable overlapping relationship with the withdrawal of the mandrels 20A, the mandrels 20B held by the right-hand second stage mandrel holder 38B-*b* are moved in the left-hand direction in FIG. 16 by means of the piston 44B-1 of the cylinder 44B and are inserted simultaneously to the blank pipes 18 clamped by the respective laterally adjoined die sets 110. Furthermore, such an alternate insertion of the left-hand and right-hand mandrel 20A and 20B is, as explained with reference to FIG. 2, is repeated for a desired number. Upon completion of such metal forming process at this second stage, an upward shifting of the left-hand and right hand stackers 36A and 36B is done, so that a following stage rack bar forming process is executed, wherein a simultaneous alternate insertion of the left-hand and right-hand mandrels 20A' and 20B' held by the mandrel holders 38A-*c* and 38B-*c* are executed. Only three shifting stages are shown in FIGS. 15 and 16. However, this is for a sake of a simplicity of an explanation. Namely, the inventor does not have any intention to limit the present invention to this particular stage number.

According to the present invention, when a mandrel insertion operation is done, the plurality of the die sets 110 takes a condition as shown in the lower half in FIG. 15. In this condition, the die sets 110 are arranged under a laterally adjoining (combined) relationship. Namely, these laterally adjoined die sets 110 are held between the piston 32-1 and the stopper member 34. The insertion of the mandrels 20A or 20B to the blank pipes 18 held by the respective die sets 100 causes the split die members 112 and 114 to be subjected to a toppling moment on the bed 30. Such a toppling moment M is the distance L from the bed 30 to the die set 110 multiplied by a pressing force P, i.e., M=L×P. Thus, the value of the toppling moment does not depend on the number of the die sets due to their laterally adjoined arrangement according to the present invention. In other words, irrespective of the number of the die sets 110, the value of the toppling moment M is unchanged.

Now, an advantage of the laterally adjoined arrangement of the die sets 110 according to the present invention will be discussed. Between the adjacent die sets 110, reaction forces are cancelled due to the fact the die member 112 on one of the die sets 110 and 114 and the die member 114 on the other die set are contacted with each other. This means that a pressing force by the hydraulic cylinder 32 for maintaining the die sets 110 to close does not depend on the die set number. In other words, irrespective of an increase in the number of the die sets 110 for an increased productivity, a corresponding increase in the output of the cylinder 32 is not required. Thus, a relatively reduced output of the cylinder 32 of a reduced cost can be used.

As shown in FIG. 15, the direction of the movement of the mandrels 20A and 20B and the direction of the movement of the die sets 110 lie in a horizontal plane, although they are transverse with each other. Furthermore, as shown in FIG. 16, above the die sets 110, a space opened upwardly is created, in which space a loader 111 is arranged. The loader 111 is for introducing downwardly blank pipes 18' to the die sets 111 as shown by an arrow $b_1$ and for removing upwardly the finished products (rack bars) from the die sets 110 as shown by an arrow $b_2$. Furthermore, the upwardly opened space is advantageous in that the maintenance operation of the die sets 110 is simplified. Furthermore, the stacker frames 40A and 40B for holding the mandrel holders 38A-*a*, 38A-*b* and 38A-*c* and 38B-*a*, 38B-*b* and 38B-*c* are also upwardly opened, by which the maintenance operation of the mandrel holders can also simplified.

Figure 17:
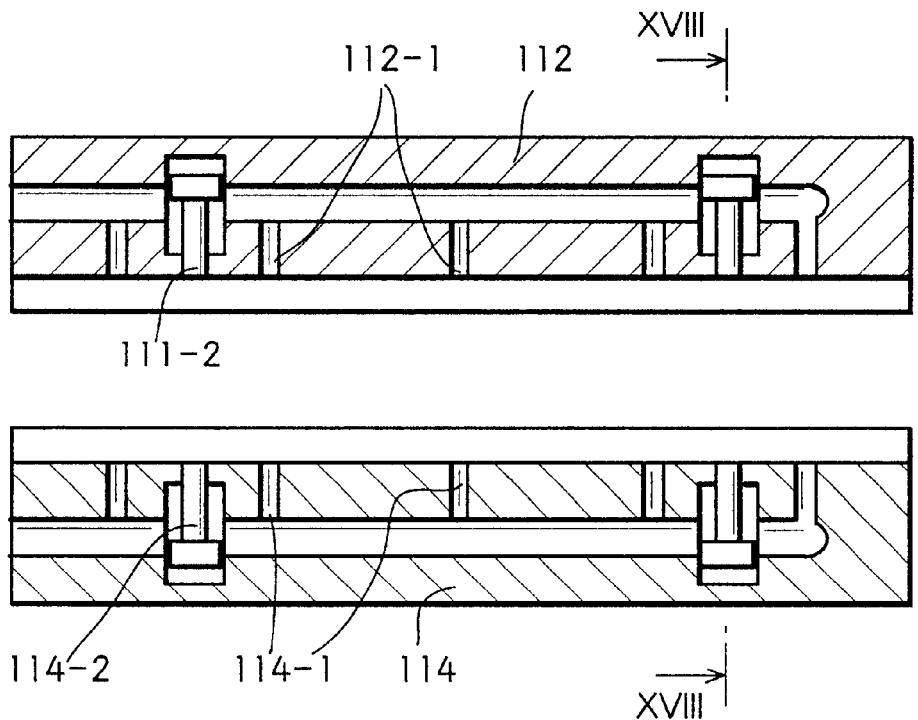
FIG. 17 is a cross-sectional view of a die set used in the double stacker system in FIGS. 15 and 16.
Figure 18:
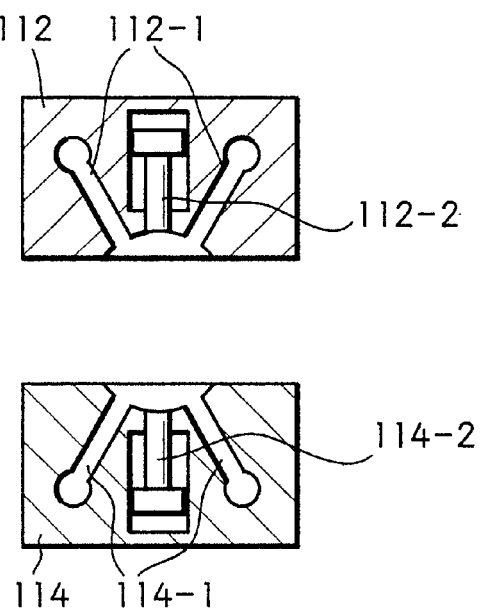
FIG. 18 is a cross-sectional view taken along a line XVII—XVII in FIG. 17.

FIGS. 17 and 18 illustrate, in the split die members 112 and 114 constructing the nozzle head 110, nozzles for injecting a washing fluid and ejecting device for detaching a work attached to the die. First, the execution of the continuous forging makes a heat to be accumulated, which makes it necessary that the die is showered by a fluid for cooling. Furthermore, when the die set is opened for removing a work after completion of the continuous forming process, it is necessary that an ejection of a washing fluid is done. Such a washing fluid is directed to the teeth forming surface (toothed portions 12 on the toothed die 26 in FIG. 6A) as well as to the opposite supporting surface 14-1, so that residues due to the bonderizing or any other dusts are deleted. Such a washing process is important for keeping a cleaned state of the die set, which is important for preventing the defects from being generated. In order to keep the cleaned stated of the die sets, it is desirable that a distance between the washing liquid and the bed surface is as short as possible. In order to obtain such a small distance arrangement, ejecting nozzles 112-1 and 114-1 are opened to the forming surfaces of the split die members 112 and 114 as shown in FIGS. 17 and 18. When the split die members 112 and 114 are opened after the completion of the metal forming process, the washing liquid is ejected toward the opposite split die member, so that an washing and cooling are executed simultaneously. Furthermore, the device for removing the finished work is constructed by ejector pins 112-2 and 114-2 in FIGS. 17 and 18, which are normally under a retracted position and are, during the operation, ejected outwardly, so that the work otherwise contacted with the inner surface of the die is separated. As a result of these solution in accordance with the present invention, a generation of flaw as is prevented, on one hand and, on the other hand, the previous mentioned quasi or semi warming condition around 200° C. is maintained.

Figure 19:
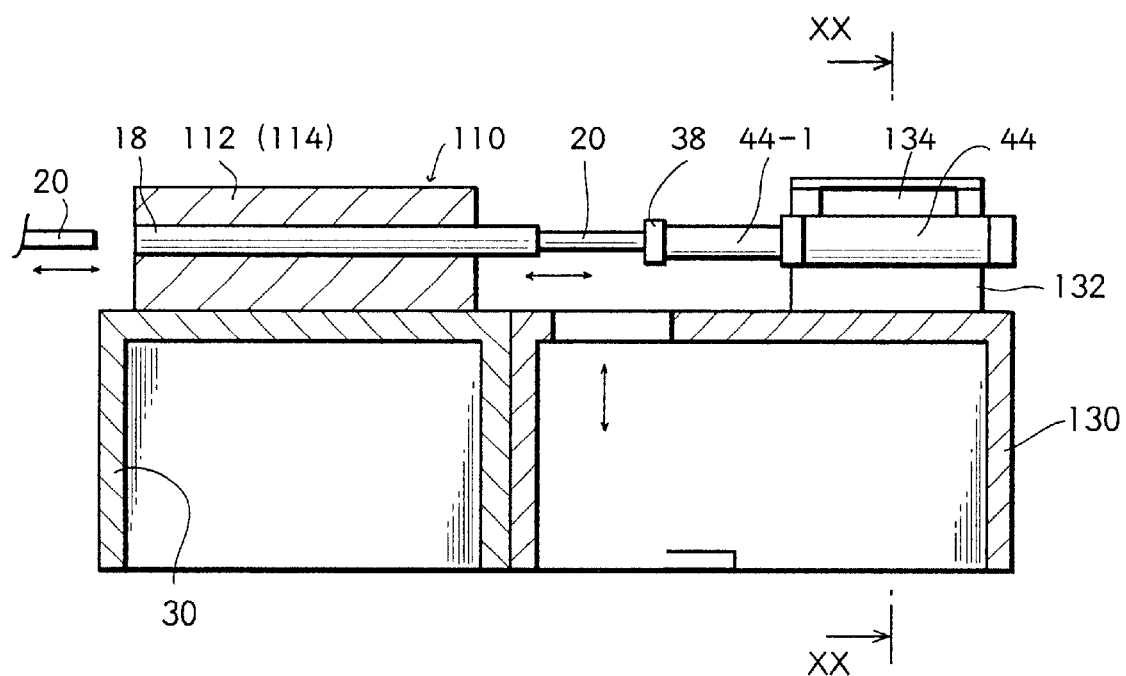
FIG. 19 is a schematic cross-sectional view of a bending moment canceling type system for supporting a pressing cylinder for a mandrel.
Figure 20:
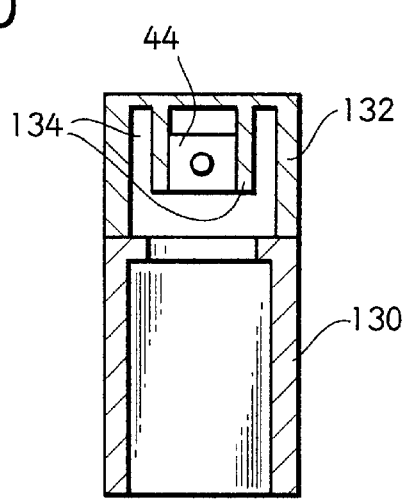
FIG. 20 is a cross sectional view taken along a line XX—XX in FIG. 19.

FIGS. 19 and 20 illustrate a modification of a supporting device for a cylinder for inserting a mandrel. In the arrangement in FIGS. 19 and 20, for the sake of the simplicity, only one hydraulic cylinder 44 on the right-hand of the die set 110 for insertion of a right-hand mandrel is shown. In a similar way to that shown in FIG. 16, a similar hydraulic cylinder is arranged also on the left-hand side of the die set 110. A reference numeral 130 denotes a stand, on which a support frame of a substantially C-shaped cross section. The supporting frame 132 is, at its inner surface, provided with a pair of reverse bending ribs 134 which extend downwardly in a cantilever fashion. Connected to the ribs 134 is a body of a hydraulic cylinder 44. The hydraulic cylinder 44 is provided with a piston rod 44-1. The piston rod 44-1 has an outer end on which a mandrel holder 38 for holding a mandrel 20 is connected. When the piston rod 44-1 is extended, the mandrel holder 38 at the end of the piston rod 44-1 as well as the mandrel 20 held by the mandrel holder 33 is moved in the left-hand direction in FIG. 19. As a result, the mandrel 20 is inserted to the blank pipe 18 held by the die set 110 on the stand 30, resulting in an execution of the metal forming process for obtaining a rack bar explained in detail over the reference to FIG. 2.

Next, operation of the reverse bending ribs 134 in FIGS. 19 and 20 will be explained. Due to the hydraulic cylinder 44 arranged in a cantilever fashion, the stress as generated by the insertion of the mandrel 20 to the blank pipe 18 causes the supporting frame 132 to be deflected or bent upwardly. If the hydraulic cylinder 44 were directly mounted to the supporting frame 132, the above-mentioned bending of the supporting frame 132 would cause the pressuring axis of the mandrel 20 to be upwardly deflected. As a result, an off-centered or deviated load is generated in the mandrel 20, resulting in a reduction in its service life. Contrary to this, the hydraulic cylinder 44 in the embodiment in FIGS. 19 and 20 is mounted to the reverse bending ribs 134, which are connected, in a cantilever fashion, to an upper part 132-1 of the supporting frame 132. In this structure of the present invention, upon the insertion of the mandrel 20 to the blank pipe 18, the direction of the deflection of the reverse bending ribs 134 is downward, i.e., opposite to the direction of the deflection of the supporting frame 132. This means that, by a desire arrangement of the reverse bending ribs 134, the upward deflection of the supporting frame 132 can be cancelled by the reverse bending of the ribs 134, 50 that a deviation in the pressing axis of the mandrel can be negated or reduced, thereby obtaining a prolonged service life of the mandrel.

Now, a construction of split die members 112 and 114 by which the die set 110 is constructed will be briefly explained. In case where an increased precision is unnecessary or the shape is easy for the formation, the toothed die can be functioned as the clamp die itself. However, in case where an increased precision is necessary or the shape is difficult for formation, it is necessary that the toothed die is separately made and is housed in a clamp die. In this case, it is necessary that the clamp die is a split type. Such a split type clamp preferably includes inner injector nozzles for injecting a washing liquid for preventing a defect from being generated in a product. Furthermore, an occurrence of a sticking of a work piece may, at worst, cause the work removing device to be damaged. From this viewpoint, it is desirable to equip a positive type work-removing device. Furthermore, a variation in the degree of a work opening may cause a work feed efficiency to be reduced, thereby reducing productivity. In order to combat to this problem, it is desirable that a work opening control device of an injection nozzle work ejector type is provided.

Figure 21:
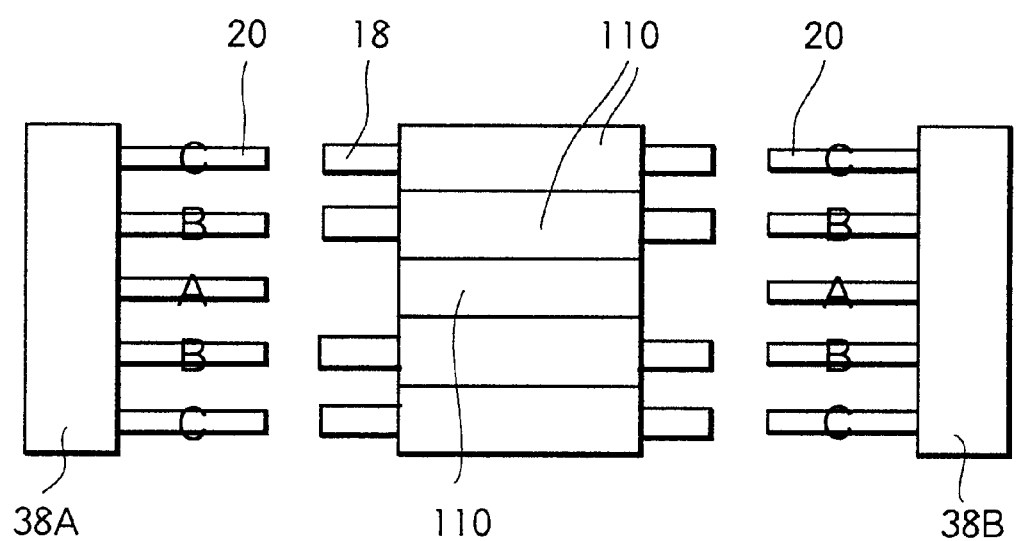
FIG. 21 illustrates schematically an arrangement of different types of mandrels on a mandrel holder.

Now, a working of different kinds of products without changing a die set-up by using the multi-mandrel type multi-shifting device as shown in FIGS. 15 and 16 will be explained. First, a number of mandrels held by the mandrel holders should, preferably, be an odd number. Namely, in the embodiment in FIG. 16, the mandrel holder 38A or 38B is able to hold three mandrels 20. Furthermore, in an arrangement as shown in FIG. 21, the mandrel holder 38A or 38B is able to hold five mandrels 20. During a simultaneous formation of products of different kinds of different mandrel insertion force, it is important that any off-centered load does not substantially occur in the mandrel presser cylinder 44A or 44B in FIG. 16. In the arrangement in FIG. 21, a simultaneous processing of three different kinds of products A, B and C are done, while the production amount of A is the smallest, the production amount of B medium and the production amount of C the largest. The product A of the least amount is produced at the centrally located mandrels. The product B of the medium amount is produced at the mandrels located outwardly adjacent the centrally located mandrels. Furthermore, the product C of the largest amount is produced by the outermost mandrels. In FIG. 21, it is shown that each of the mandrel holder 38A and 38B are full, i.e., are provided with one mandrel for product A, two mandrels for product B and two mandrels for product C. In this set-up in FIG. 21, in case where the situation is arisen that any production of the product A is unnecessary, a feed of a blank pipe 18 by the loader to the die set 110 for the product A can be simply stopped. In other words, without changing the die set-up, a production of the products B and C can be continued.

Next, a production of a plurality of deferent types of products without changing a die set-up by using the multi-stage mandrel holder shifting device in FIGS. 15 and 16 will be explained. When a first kind product to be obtained at 6 operating steps and a second kind product to be obtained at 10 operating steps are, for example, produced by a device having left and right eight stage stackers, upper three stages of left-hand and right-hand stackers are used for producing the first type products and lower five stages of left-hand and right-hand stackers are used. By starting the operation from the uppermost stage, steps including a loading of mandrel holder, an insertion of mandrels and removal of mandrel on the left-hand and right-hand sides are repeated alternately six times, thereby obtaining the first kind products. As for the lower five stages, similar alternate operation between the left-hand and right-hand sides is done, thereby executing ten-step operation, thereby obtaining the second kind products. The following example is for, without changing die set-up, producing third kind products obtainable at eight steps and fourth kind products obtainable at eight steps. In this case, by the upper four stages of the left-hand and right-hand stackers, a production of the third kind products is done. Furthermore, by the lower four stages of left-hand and right-hand stackers, a production of the fourth kind products is done.

Figure 22A:
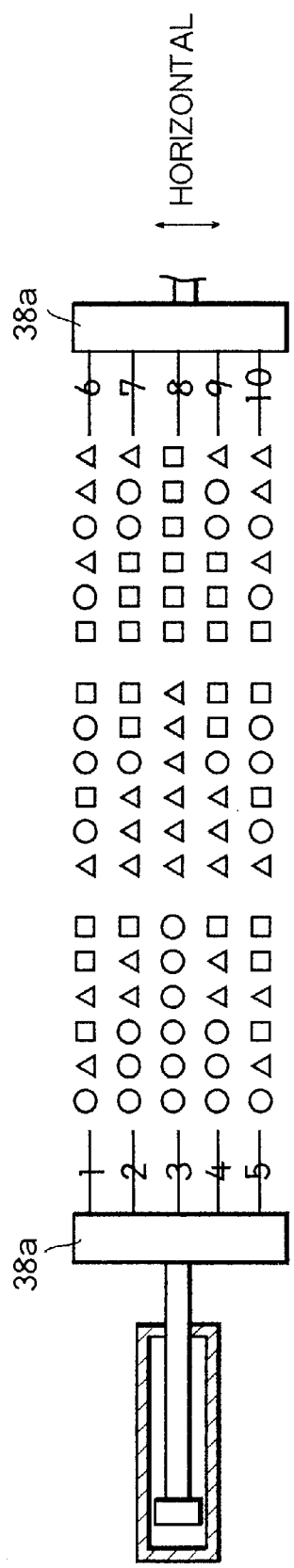
FIG. 22A illustrates various arrangements of different types of mandrels on a mandrel holder.

FIG. 22A illustrates further examples a to r for producing, simultaneously, different kinds of products by keeping one and the same die set-up. Namely, FIG. 22A illustrates a pair of opposite mandrel holders 38*a* in one operating stage in the multi-stage stacker device. Each of the mandrel holders 38*a* includes five mandrels. The shapes of the products to be produced are illustrated symbolically by circles, triangles and squares. In this case, as explained with reference to FIG. 21, for each of the examples of the arrangement of the mandrels a to r, the arrangement is symmetrical for preventing any deviation in the load from being generated.

Figure 22B:
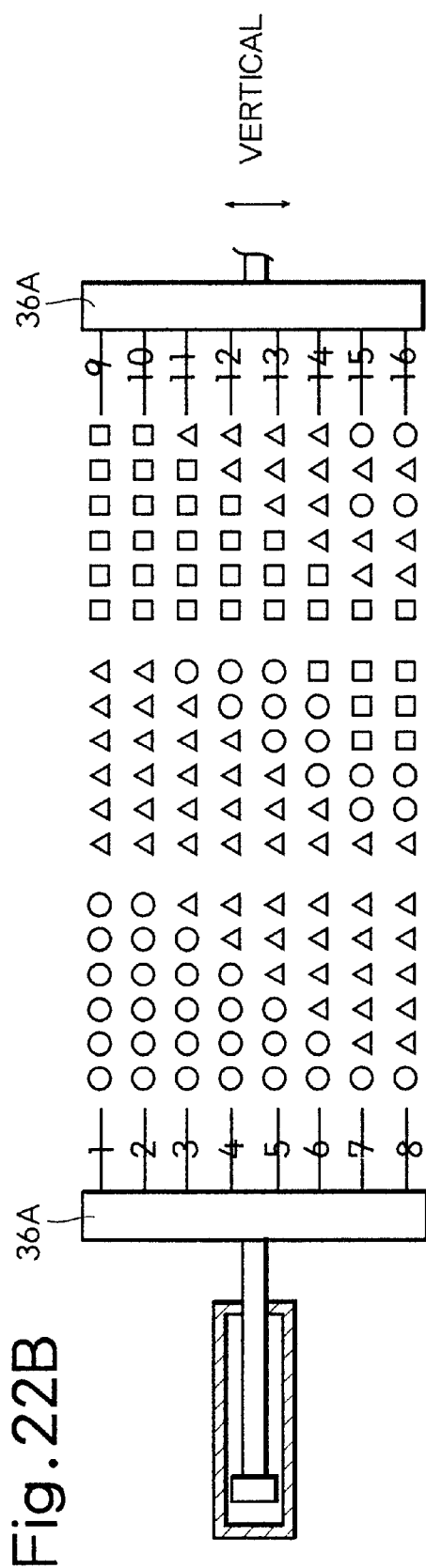
FIG. 22B illustrates various arrangements of different types of mandrels on mandrel holders in stackers.

FIG. 22B illustrates various examples a to r in the arrangement of the mandrels in the shift or vertical direction of the left-hand and right-hand stackers 36A and 36B. Namely, the example a shows that only the product symbolically designated by the circle are ordered, the example g shows that only the product symbolically designated by the triangle are ordered, and the example m shows that only the product symbolically designated by the square are ordered. Upon the reduction of the amount of the order from a customer, the number of the die-sets on which the blank pipes are set is simply reduced. When the order of products symbolically illustrated by the circle and triangle are predicted, a combination b or h can be employed. The number of the die-sets on which the blank pipes are installed are determined in accordance the amount of the order of the products as designated by the circle and the triangle. In short, it will be understood that a desired amount of the desired type of products can be produced keeping the one and the same die set-up, i.e., without changing the arrangement of the mandrels as well as the die sets. Furthermore, in case where three kinds of products symbolically illustrated by the circle, the triangle and the square, a combination c, d, e, f, i, j, k, l, n, o, p, q or r is selected in accordance with the ratio between the kinds of products. Namely, three kinds of products can be simultaneously produced while keeping the same die set-up.

What is claimed is:

1. A process for producing an article with toothed portions, such as a pipe shaped rack bar, comprising the steps of:
    a) providing a die having, at its inner surface, toothed portions;
    b) holding a blank pipe in the die;
    c) providing a mandrel having a tapered operating head;
    d) inserting, repeatedly, the mandrel into an axial space of the blank pipe, so that the operating head of the mandrel causes the material to be flown radially outwardly toward the inner surface of the die, thereby generating toothed portions on the blank pipe corresponding to the toothed portions of the die;
    e) maintaining during the repeated insertions of the mandrel, an increased temperature of the work generated substantially solely by a heat due to the execution of the insertion of the mandrel to the blank pipe, which temperature is substantially in a range where a so-called work-softening phenomenon is obtained;
    f) preventing, during the repeated insertions of the mandrel, the metal from being subjected to an age-hardening, and;
    g) canceling, during the repeated insertions of the mandrel, a deviated flow of a metal flow toward the die.

2. A process according to claim 1, further comprising the step of starting the metal forming of the blank pipe at room temperature.

3. A process according to claim 1, further comprising the step of heating at least the blank pipe to a desired temperature prior to commencement of the metal forming.

4. A process according to claim 1, wherein said blank pipe is a seamed type.

5. A process according to claim 1, further comprising the step of grinding, prior to the teeth formation, the blank pipe at a location where toothed portion are to be formed.

6. A process according to claim 1, further comprising the step of flattening, prior to the teeth formation, the portion of the blank pipe where the toothed portion is formed.

7. A process according to claim 6, wherein said step of flatting comprises the step of introducing a blank pipe into the die upon opening and closing of the die, thereby flattening the blank pipe.

8. A process according, to claim 1, wherein said step of maintaining the increased temperature of the work comprises the step of repeating, for a predetermined number, the insertion of the mandrel with the tapered operating head to the blank pipe.

9. A process according to claim 1, wherein said step of canceling the deviated flow comprises the step of alternately changing the direction of the insertion of the mandrel to the blank pipe.

10. A process according to claim 9, wherein said alternate changing direction is overlapped such that the insertion of the mandrel to the blank pipe in one direction is commenced prior to the completion of withdrawal of the mandrel from the blank pipe in the other direction.

11. A process according to claim 1, wherein the step for providing the mandrel comprises the step of providing mandrel with a plurality of tapered operating heads.

12. A process according to claim 1, further comprising the step of lubricating the die, while preventing the blank pipe from being positively cooled until the completion of the process.

13. A process according to claim 1, wherein the step of providing the die comprises the steps of providing a toothed die for a metal forming and a holder for holding the toothed die and press-fitting or embedding said toothed die to the holder.

14. A process according to claim 1, further comprising the step of heat-treating the work after completion of the metal forming while the work is subjected to a constraint.

15. A process according to claim 1, further comprising the step of controlling the flow of the metal to the die so as to be the latter to be partially filled by the metal.

16. A process according to claim 1, further comprising the step of keeping the die set in a clamped condition throughout the metal forming operation, while preventing any washing as well as cooling of the die from being executed.

17. A process for producing a rack bar, comprising the steps of:
    a) providing a die having, at its inner surface, toothed portions along the length of the die;
    b) holding a blank pipe in the die;
    c) providing mandrels each having at least one tapered operating head;
    d) inserting, repeatedly, the mandrels into an axial space of the blank pipe so that the operating head of the mandrel causes the material to be flown radially outwardly toward the inner surface of the die, thereby generating toothed portions on the blank pipe corresponding to the toothed portions of the die;
    e) reversing, alternately, the direction of the insertion of mandrels to the blank pipe for maintaining a symmetrical flow of a metal toward the die, and;
    f) overlapping the insertion of the mandrel one side of the blank pipe and the withdrawal of the mandrel on the other side of the blank pipe, such that the insertion of the mandrel to the blank pipe in one direction is commenced prior to the completion of withdrawal of the mandrel from the blank pipe in the other direction, and;
    g) maintaining an increased temperature of the work generated substantially solely by a heat due to the execution of the insertion of the mandrel to the blank pipe.

18. A die assembly comprising a die holder having an outwardly opened and longitudinally extending recess, a toothed die detachably housed in said recess and at least one tapered piece press fitted to said recess of the die holder for causing the toothed die to be longitudinally urged, so that the toothed die is fixedly held in the recess of the die holder, said die holder having a hole extending therethrough and opened to said tapered piece at a bottom surface of the recess, the hole being for receiving a presser which is engaged with the pin for causing the tapered piece to be withdrawn from said recess, thereby allowing the die assembly to be dismantled.

19. A die assembly according to claim 18, wherein said recess for receiving the toothed die having at least one longitudinal end with which the tapered piece contacts and which is rounded at a diameter corresponding to the width of said recess.

20. A die assembly according to claim 18, further comprising a liner, which is arranged at a bottom of said recess in such a manner that the toothed die contacts at its bottom surface with said liner.

21. A die assembly according to claim 18, wherein said toothed die is machined by a wire cut machine provided with a numerical control device.

22. A die assembly according to claim 18, wherein said toothed die has a value of HRC hardness in a range between about 51 to about 54.

23. A linear operated metal forming device for producing a pipe shaped rack bar from a blank pipe, comprising:
   a plurality of die sets, each die set being capable of moved between a closed position for holding a blank pipe as a work and an opened position for allowing the work to be taken out;
   a bed on which said die sets are arranged in parallel;
   a first presser of said die sets, by which the die sets are laterally adjoined with each other while the blank pipes are held by the respective die sets;
   mandrels to be inserted to the respective blank pipes;
   a mandrel holder for holding, in parallel, the mandrels at a predetermined spacing, and;
   a second presser of said mandrel holder, by which the mandrels held by the holder are simultaneously inserted to the respective blank pipes held by the respective die sets, so that the blank pipes are subjected simultaneously to the metal forming process, thereby forming, on the outer surfaces of the blank pipes, teeth corresponding the toothed portions of the respective die sets.

24. A device according to claim 23, wherein each of said mandrel comprises axially spaced heads having respective operating diameters, the values of which are increased in the direction of an increase in the insertion depth of the mandrel.

25. A linear operated metal forming device according to claim 23, wherein each of the die sets is constructed by split die members, a holder of the split die members and auxiliary units including at least one nozzle for a cleaning liquid and an ejector such of a work stuck to the die.

26. A linear operated metal forming device according to claim 23, wherein an opened space is formed above the die sets, thereby allowing the blank pipes to be introduced from above into the die sets and allowing finished works to be removed upwardly.

27. A linear operated metal forming device according to claim 26, further comprising a loader for the blank pipes as well as finished products arranged in said space.

28. A linear operated metal forming device according to claim 23, wherein the axis of the first presser and the axis of the second presser are arranged in such a manner that they are crossed in a horizontal plane, thereby producing a space above the die sets.

29. A linear operated metal forming device according to claim 23, wherein the number of the mandrel held by the respective mandrel holder is an odd number.

30. A linear operated metal forming device for producing a pipe shaped rack bar from a blank pipe, comprising:
   a plurality of die sets, each die set being capable of moved between a closed position for holding a blank pipe as a work and an opened position for allowing the work to be taken out;
   a bed on which said die sets are arranged in parallel;
   a first presser of said die sets, by which said die sets are laterally adjoined with each other while the blank pipes are held by the respective die sets;
   a plurality of mandrels to be inserted to the respective blank pipes;
   a plurality of mandrel holders, each of which is for holding, in parallel, the mandrels at a predetermined spacing;
   a stacker for holding mandrels so that they are stacked with each other;
   the arrangement of the mandrels between the stacked holders being such that the degree of the metal forming is progressed in the stacked direction;
   a second presser by which the stacker are progressively shifted in the stacker so that the mandrel holders of different stages are progressively aligned with the die sets, and;
   a third presser by which the mandrels held by the aligned mandrel holder are simultaneously inserted to the respective blank pipes in the die sets and withdrawn from the respective blank pipes, thereby executing a multi-stage working by progressively changing the mandrels inserted to the blank pipes by the stepwise displacement of the mandrel holders in the stacker.

31. A linear operated metal forming device for producing a pipe shaped rack bar from a blank pipe, comprising:
   a plurality of die sets, each die set being capable of moved between a closed position for holding a blank pipe as a work and an opened position for allowing the work to be taken out;
   a bed on which said die sets are arranged in parallel;
   a first presser of said die sets, by which said die sets are laterally adjoined with each other while the blank pipes are held by the respective die sets;
   a plurality of mandrels to be inserted to the respective blank pipes;
   a plurality of mandrel holders, each of which is for holding, in parallel, the mandrels at a predetermined spacing;
   a pair of stackers for holding mandrels so that they are stacked with each other, one of the stackers being arranged on one side of the bed while the other stacker is arranged on the opposite side of the bed;
   the arrangement of the mandrels between the stacked mandrel holders being such that the degree of the metal forming is progressed in the stacked direction;
   a second presser by which the mandrel holders on one of the stackers are progressively shifted in the stacker so that the mandrel holders are progressively aligned with the die sets;
   a third presser by which the mandrel holders on the other stackers are progressively shifted in the stacker so that the mandrel holders are progressively aligned with the die sets;
   a fourth presser by which the mandrels held by the aligned mandrel holder in one of the stackers are simultaneously inserted to the respective blank pipes in the die sets and withdrawn from the respective blank pipes, and;
   a fifth presser by which the mandrels held by the aligned mandrel holder in the other stacker are simultaneously inserted to the respective blank pipes in the die sets and withdrawn from the respective blank pipes;
   the arrangement being such that, at each shifted position of the stackers, an alternated insertion to the blank pipes is done between the mandrels held by the mandrel holders aligned with the die sets in one of the stackers and the mandrels held by the mandrel holders aligned with the die sets in the other stackers.

32. A linear operated metal forming device according to claim 31, wherein the fourth presser for a reciprocating movement of the mandrels from one of the stackers and the fifth presser for a reciprocating movement of the mandrels from the other stacker are operated with independent timings.

33. A linear operated metal forming device according to claim 31, wherein the fourth presser for the mandrels in one of the stackers and the fifth presser for the mandrels in the other stacker are separated from each other.

34. A linear operated metal forming device for producing a pipe shaped rack bar from a blank pipe, comprising:

a die set for holding a blank pipe, said die set having toothed portions faced with the blank pipe;

a bed on which said die set is arranged;

a mandrel to be inserted to the blank pipe held by the die set, so that teeth corresponding to the toothed portions on the die are formed on the blank pipe;

a hydraulic cylinder for causing the mandrel to be reciprocated;

a support frame extending, in a cantilever fashion, from the bed, and;

a reverse bending rib extending, in a cantilever fashion from a free end of the, said said reverse bending rib having a free end fixedly connected to the hydraulic cylinder; and the arrangement of the support frame and the reverse bending rib being such that, during the metal forming by the insertion of the mandrel to the blank pipe, the deflection of the support frame and the deflection of the reverse bending rib are opposite each other so to substantially negate one another, thereby maintaining an alignment of the axis of the cylinder with the axis of the blank pipe.

* * * * *